United States Patent [19]
Thorson

[11] 3,948,161
[45] Apr. 6, 1976

[54] SEED CELLING MACHINE

[75] Inventor: Sheldon E. Thorson, Pleasanton, Calif.

[73] Assignee: Atlas Pacific Engineering Company, Emeryville, Calif.

[22] Filed: Sept. 18, 1974

[21] Appl. No.: 507,145

[52] U.S. Cl. .................... 99/491; 99/553; 99/564
[51] Int. Cl.² .................... A23N 4/14; B23Q 15/00
[58] Field of Search ................. 99/553, 564, 491

[56] References Cited
UNITED STATES PATENTS

| | | | |
|---|---|---|---|
| 2,705,037 | 3/1955 | Fox et al. | 99/491 |
| 2,742,066 | 4/1956 | Carroll | 99/491 |
| 3,162,225 | 12/1964 | Loveland | 99/491 |
| 3,246,676 | 4/1966 | Anderson | 99/491 |
| 3,831,510 | 8/1974 | Loveland | 99/553 |

*Primary Examiner*—Robert W. Jenkins
*Assistant Examiner*—James A. Niegowski
*Attorney, Agent, or Firm*—Robert H. Eckhoff

[57] ABSTRACT

A multi-lane machine for removing the seed cell from previously cored apples by selectively cutting a cavity therein. Various size apples are accommodated and the size of the seed cell cavity is varied depending on the size of the apple. The apples are conveyed along a path while the core hole is oriented relative to the path. Taking advantage of the alignment of the core hole, the apples are transferred onto a spindle and moved therealong by a pair of centering jaws to a seed cell station. The medial plane of the apple is positioned over a seed celling knife on the spindle while the size of the apple is measured as it is moved into the seed celling station. The knife is crescent-shaped and pivotally housed in and rotated by the spindle. A knife control mechanism extends the rotating knife into the seed cell a distance determinate of the size of the apple and in timed sequence with the movement of the jaws. Subsequently, the apple is displaced along the spindle and through a die to cut the apple in segments.

16 Claims, 38 Drawing Figures

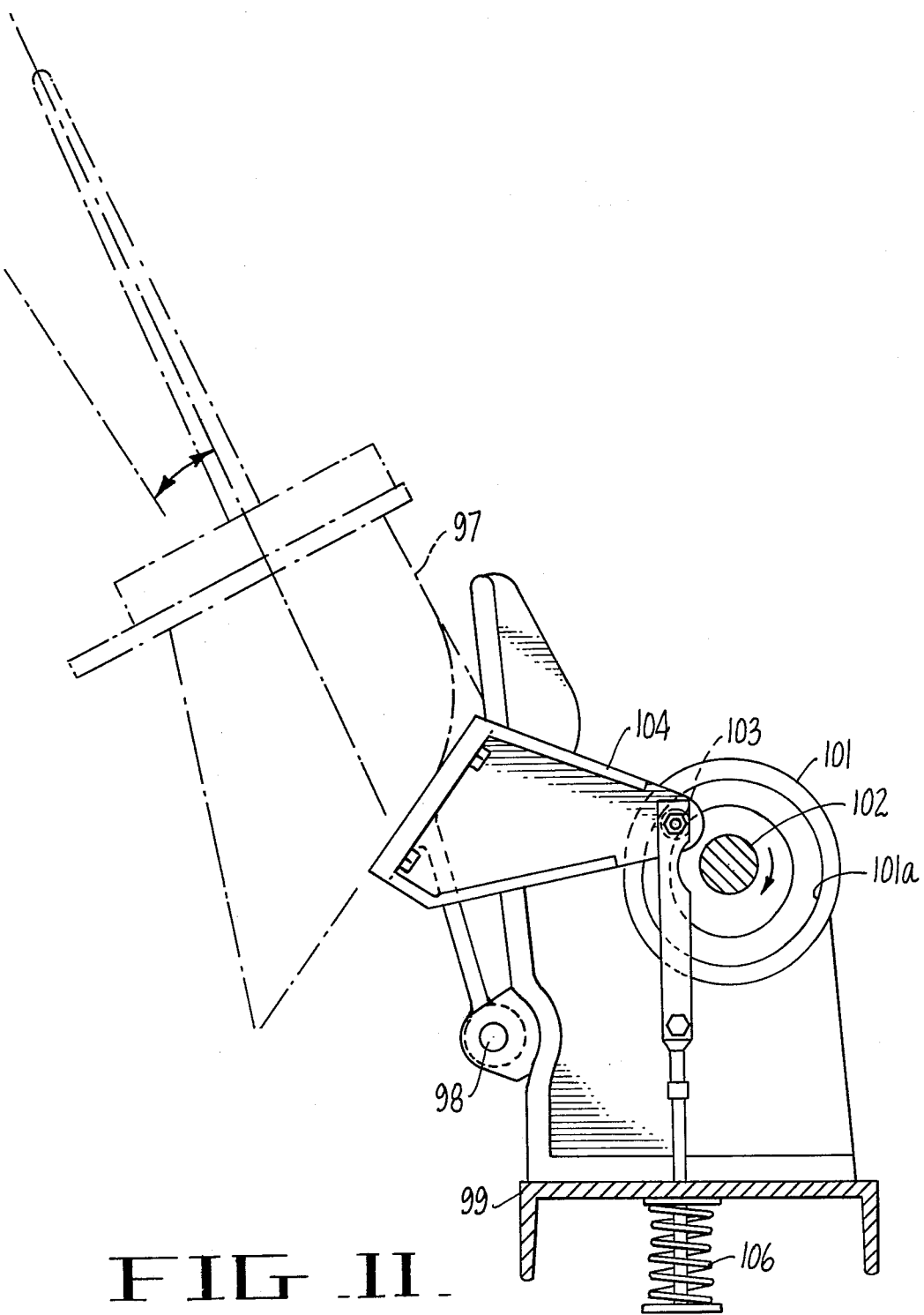
FIG. II.

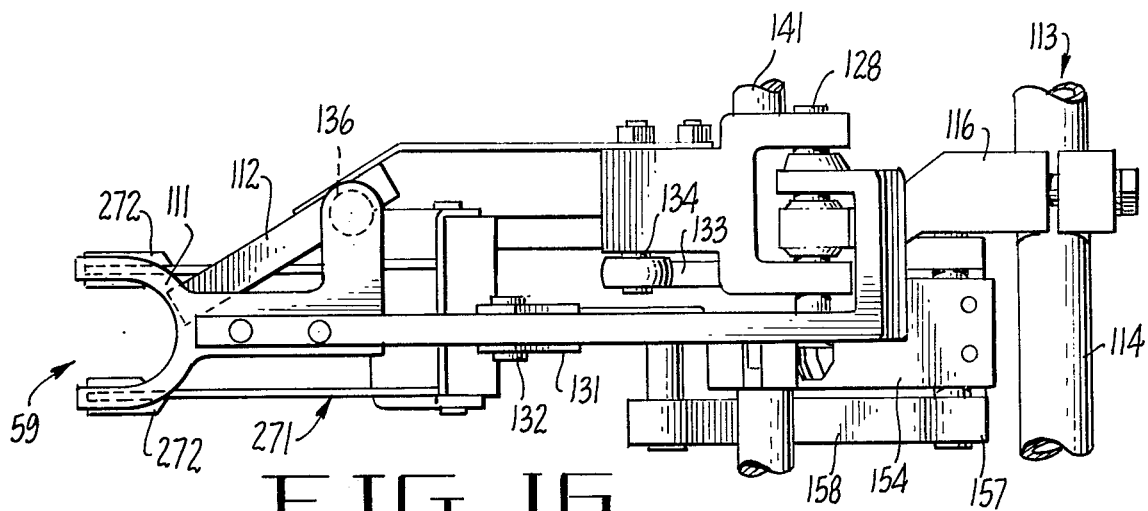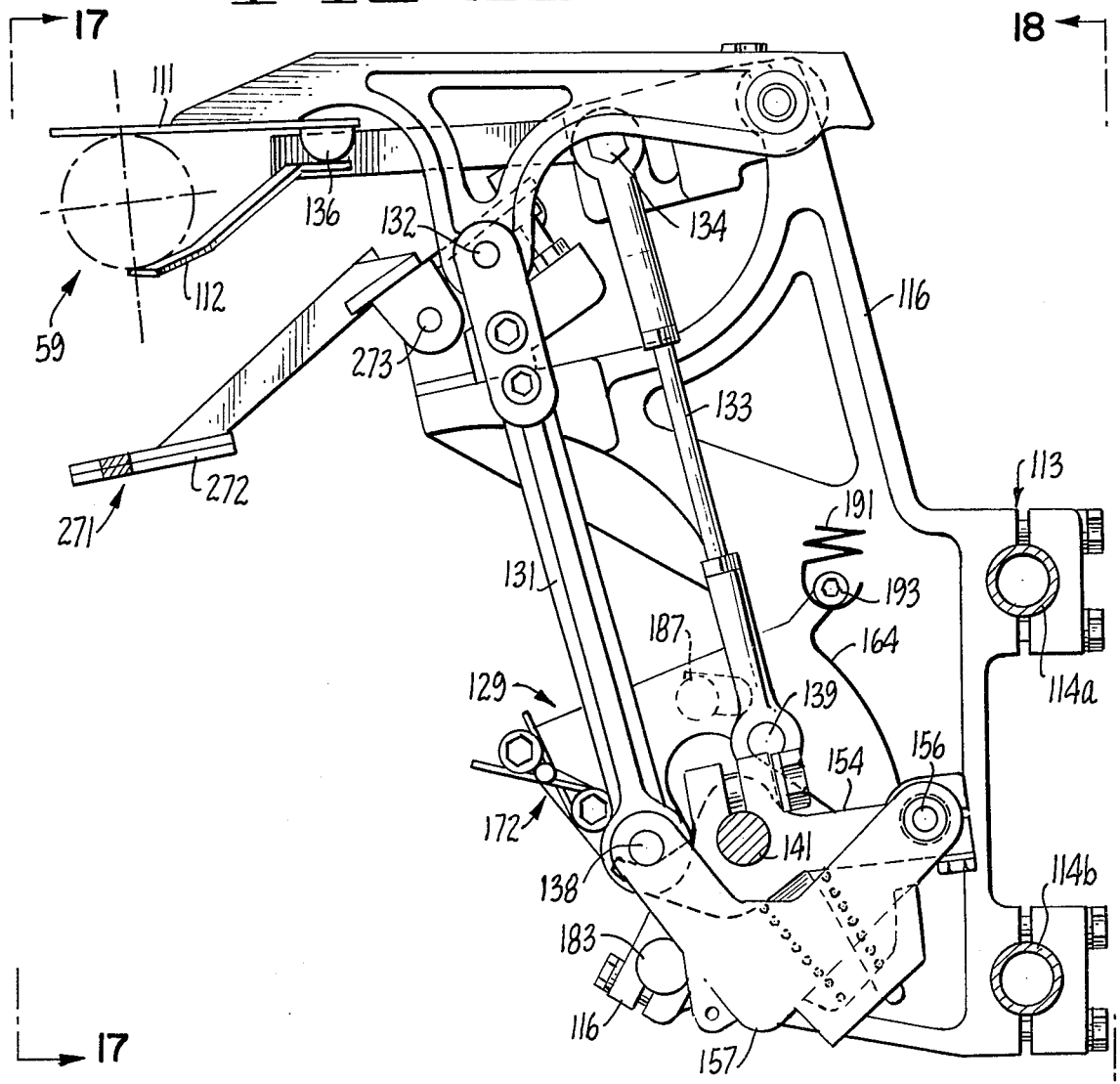

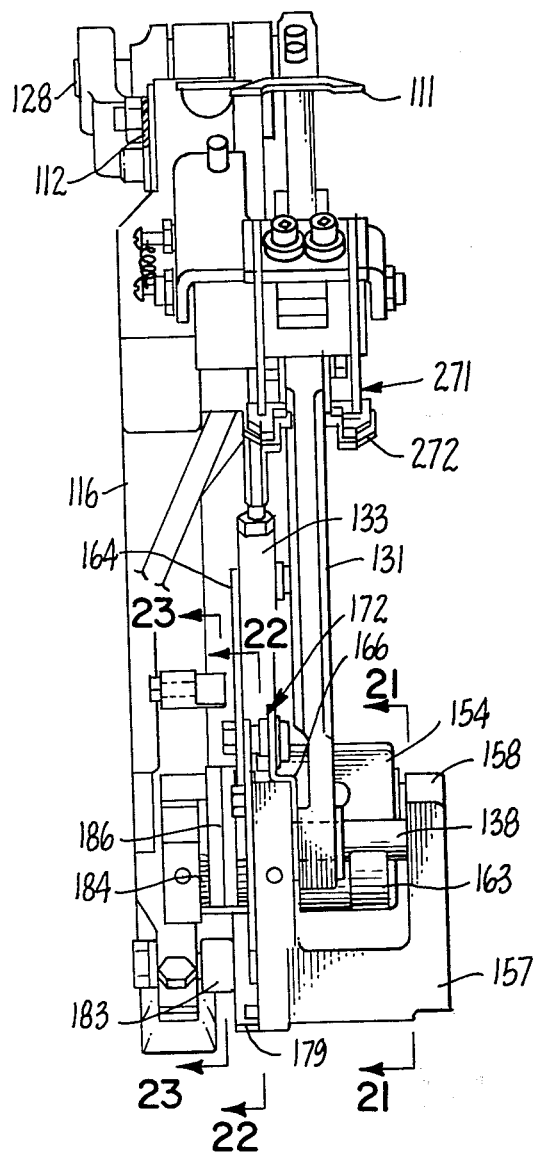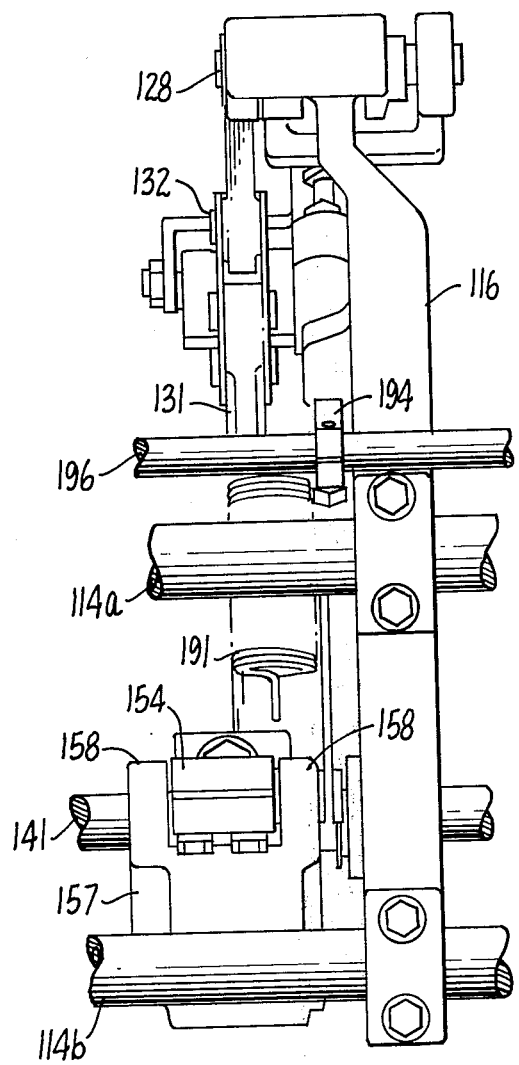
FIG_17.  FIG_18.

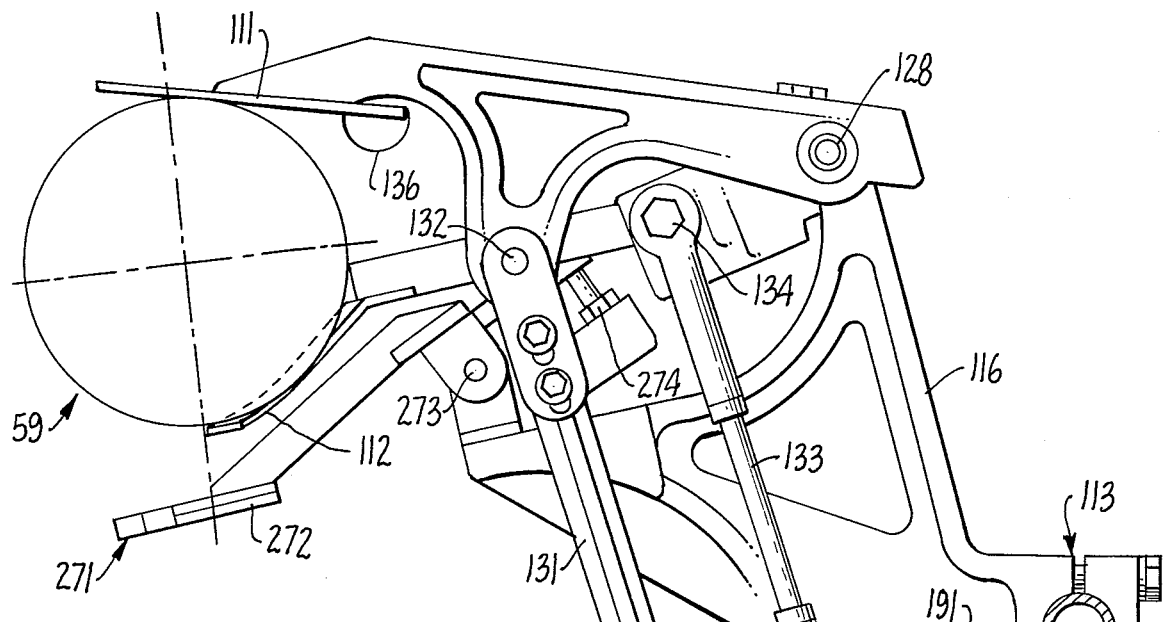

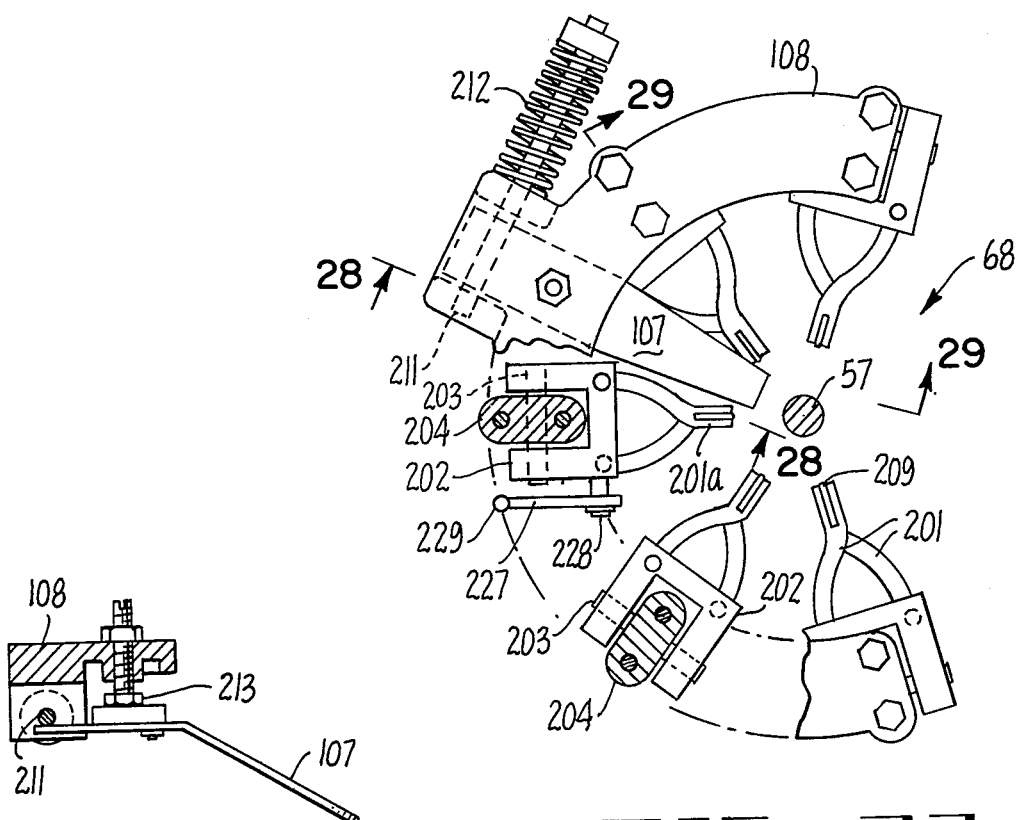
FIG. 27.
FIG. 28.
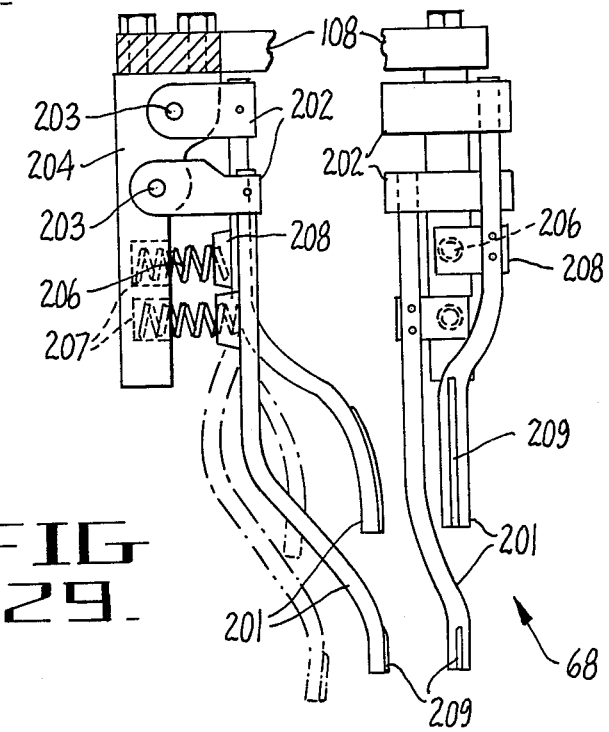
FIG. 29.

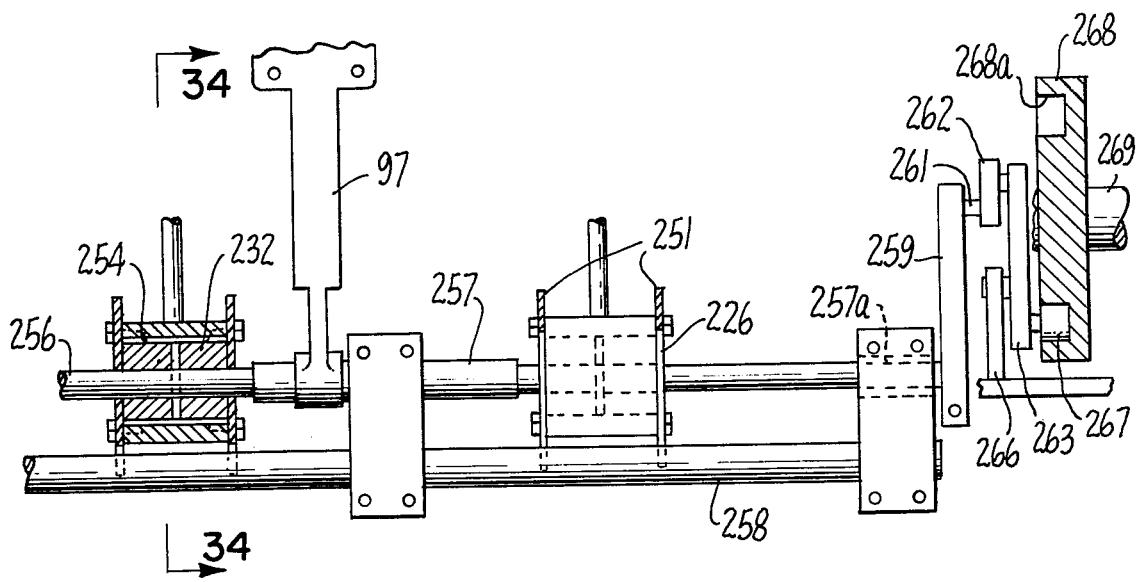
FIG. 33.
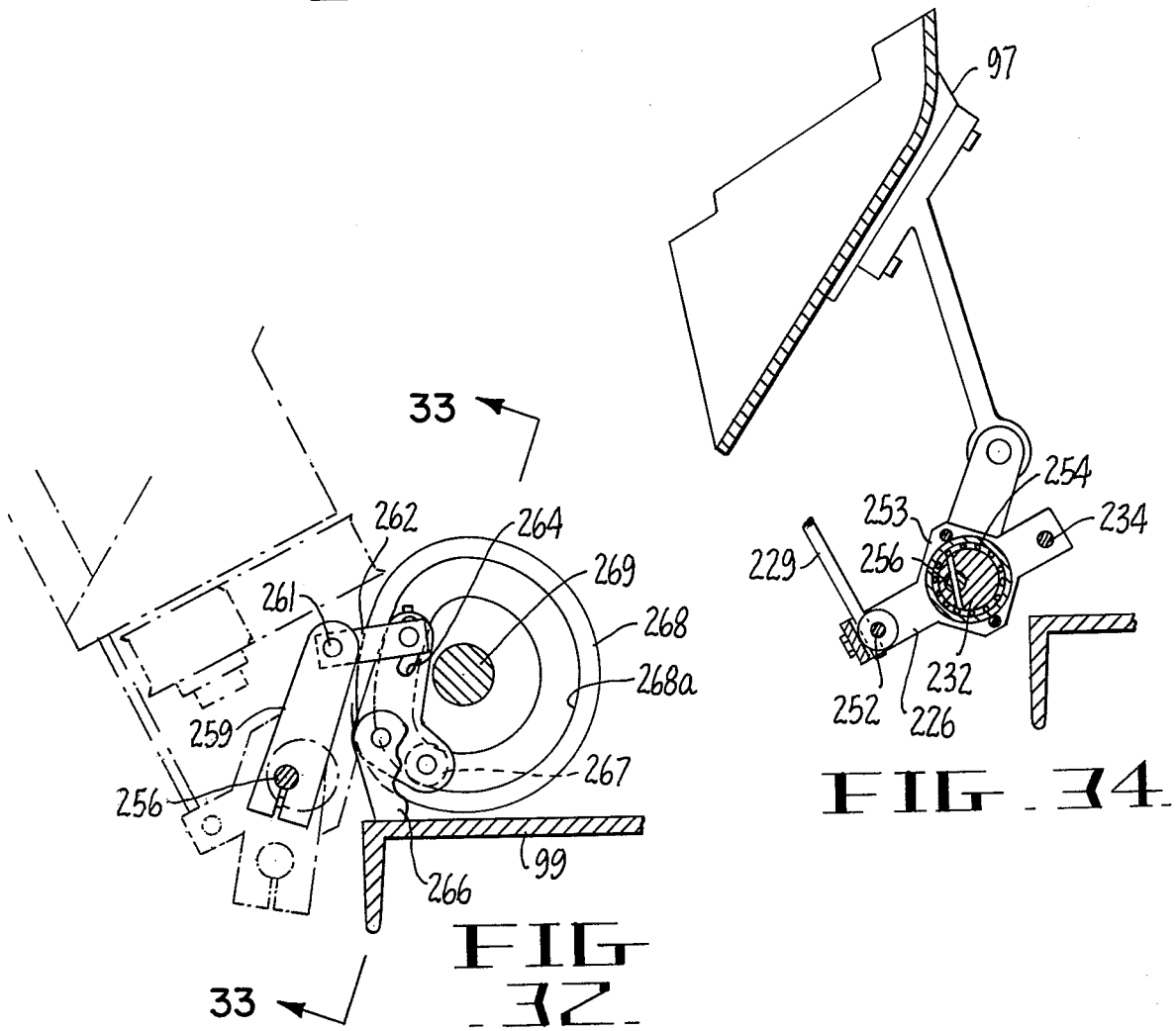
FIG. 32.
FIG. 34.

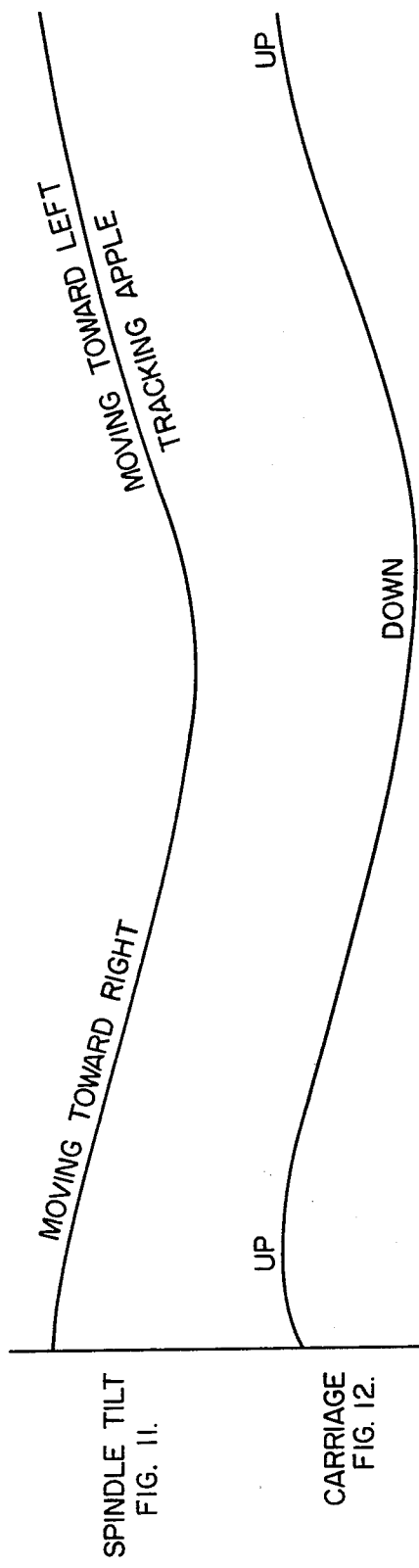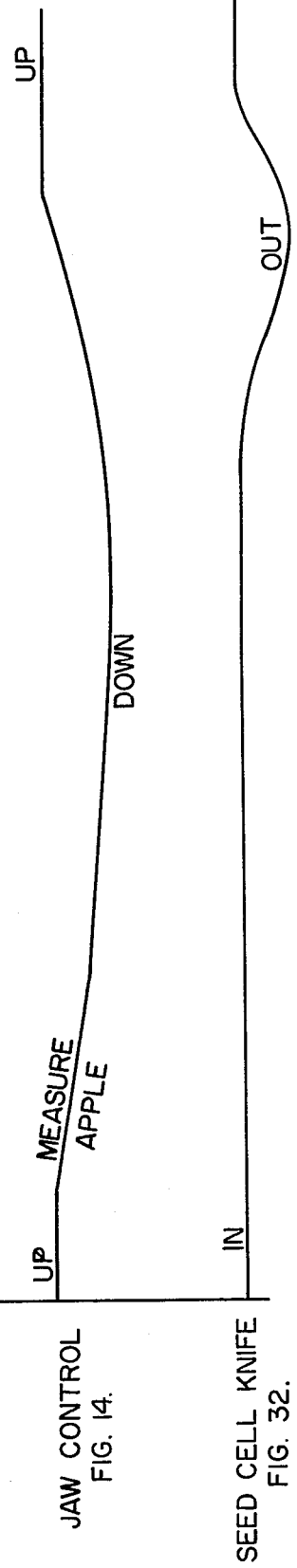
FIG. 38

SEED CELLING MACHINE

BACKGROUND OF THE INVENTION

This invention is concerned with providing a selectively movable seed cell knife for fruit processing machines of the type shown in patent application to Loveland for "Machine for Seed Celling Previously Cored Apples", Ser. No. 283,919, filed Aug. 25, 1972, and now U.S. Pat. No. 3,831,510 issued Aug. 27, 1974. As shown there, previously cored apples are fed in bulk to the machine wherein they are oriented, utilizing the core hole in the apple, following which they are transferred from the orienting mechanism onto a spindle, taking advantage of the alignment provided by the core hole. After transfer, the apples are moved to a station where they are cut to remove the fibrous carpel material surrounding the seeds together with the seeds. Following this operation, the apples are cut into segments as desired.

On the Loveland machine, the seed celling operation is performed by a pair of overlapping loop-shaped seed cell knives rigidly mounted on the spindle. When the knives are rotated, they cut a cavity around the seed cell, with the size of the cavity being the same in each apple. Since various sizes of apples are accommodated by the machine, the size of the cavity is either determined by the largest sized apple anticipated, or by some nominal size chosen. Thus, either oversize cavities are cut in small apples or some of the seed cell will not be removed from large apples, depending on the knife size chosen. This in turn leads to considerable waste or an inferior product.

SUMMARY OF THE INVENTION

It is therefore a principal object of the present invention to provide an improved seed celling device for fruit processing machines in which a cavity is cut centrally of the fruit to a size proportional to the fruit and efficiently remove the fibrous carpel material and seeds therefrom.

It is another object of the present invention to provide improved seed celling of fruit by supporting the fruit on a rotating spindle through the core hole and pivoting a crescent-shaped knife outward of the spindle to cut a spherical-shaped cavity in the fruit.

Another object is to provide such a seed celling device in which the size of the fruit is measured on the outer surface of the fruit immediately adjacent the seed cell area.

A further object of the present invention is to provide a seed celling device wherein a knife is selectively extended into the seed cell of the apple while the apple is supported in such a way as to counteract the torque and gyrational forces subjected to the apple by the knife.

A still further object is to provide an extensible seed celling knife at a station and to move an apple into the station while measuring the size of the apple. Thereafter the knife is extended into the center of the apple in timed sequence to the apple being centered at the station and to a degree determinate of the size of the apple.

Yet another object is to provide an improved multilane machine of the type in which previously cored apples are fed in single file fashion and oriented in respect to the core hole and then transferred to a spindle where the center of the apple is determined and moved along the spindle to a seed celling station. The spindle is continually rotated and a knife housed therein is retracted as the apple is centered thereover. A set of antirotational fingers grips the outer surface of the apple around the seed cell and one of the fingers measures the equitorial radius of the apple. The knife is extended into the seed cell an amount determined by the size of the apple and in a timed sequence with the apple being centered over the knife. Thereafter the apple is displaced from the seed cell station through a die of radial knives to cut the apple in segments. Such a seed celling device compliments the speed and flow of apples through this type of machine and provides for increased throughput and improved quality of product with an increase of efficiency and lack of waste.

BRIEF DESCRIPTION OF THE DRAWINGS

FIG. 10 is an enlarged fragmentary view similar to FIG. 2 looking at the end of the machine.

FIG. 15 is an enlarged elevational view of the jaw mechanism as shown in its closed position around a minimum sized apple.

FIG. 16 is a plan view of the jaw mechanism shown in FIG. 15.

FIGS. 17 and 18 are elevational views of the jaw mechanism in FIG. 15 and taken substantially along the plane of lines 17—17 and 18—18 thereof.

FIG. 19 is an elevational view similar to FIG. 15 with the jaw mechanism closed around a maximum sized apple.

FIG. 20 is an exploded perspective view of the jaw control mechanism used on the jaw mechanism illustrated in FIGS. 15-19.

FIG. 27 is a fragmentary plan sectional view taken substantially along the plane of line 27—27 of FIG. 7 illustrating the stop and antirotational fingers around the spindle.

FIG. 28 is an elevational section taken substantially along the plane of line 28—28 of FIG. 27.

FIG. 29 is a fragmentary sectional view taken substantially along the plane of line 29—29 of FIG. 27.

FIG. 32 is an elevational section taken substantially along the plane of line 32—32 of FIG. 2 with parts broken away and illustrating the actuating cam and linkage for the knife control timing means.

FIG. 33 is a fragmentary elevational section taken substantially along the plane of line 33—33 of FIG. 32 illustrating the suspension of the knife control timing means.

FIG. 34 is an elevational section taken substantially along the plane of line 34—34 of FIG. 33 and illustrating the lever mechanism in the knife control means.

FIG. 38 is a timing chart of the various cam actuated movements of the present machine and their interrelationship to the action of the seed cell slicing knives.

DESCRIPTION OF THE PREFERRED EMBODIMENT

Figure 1:
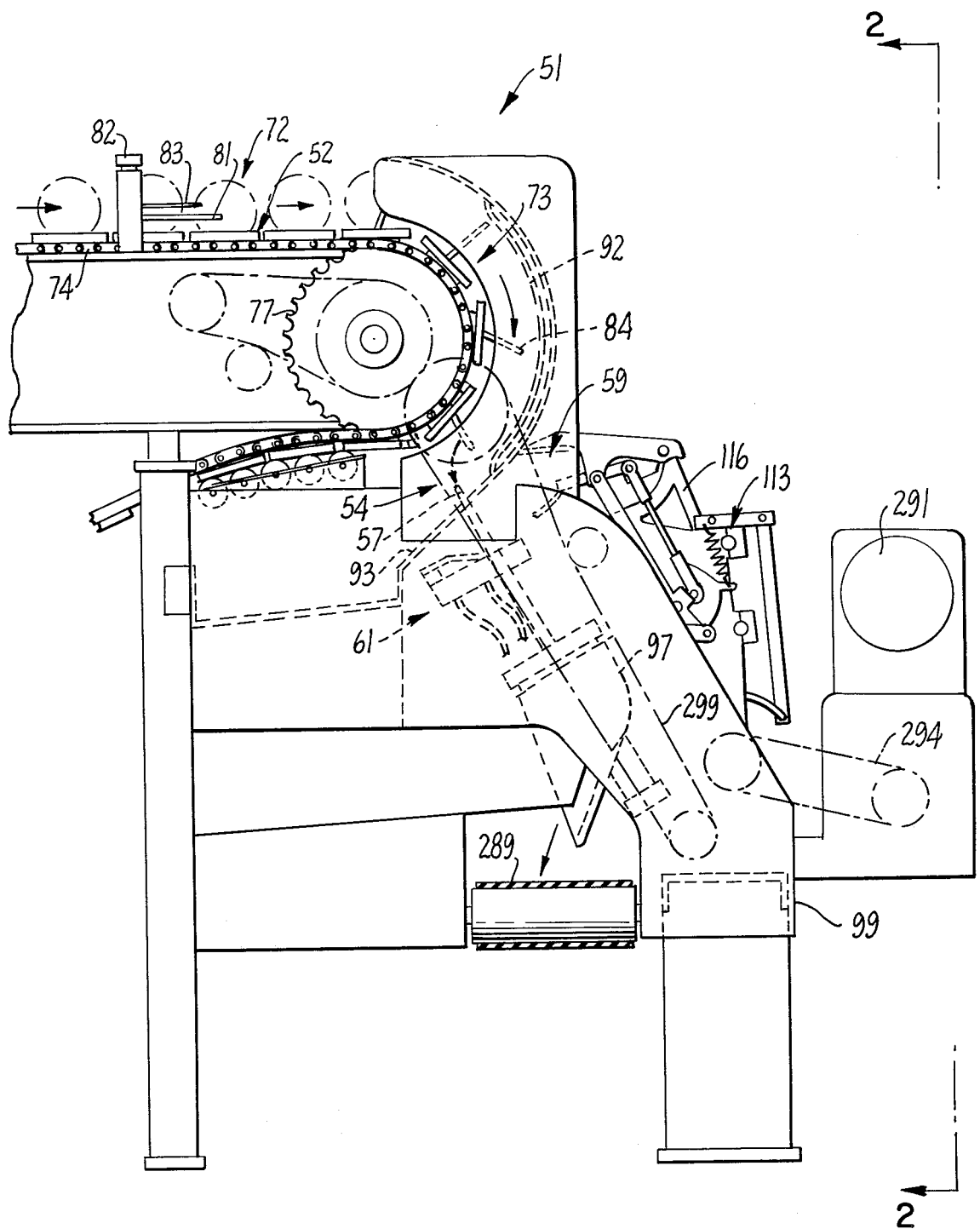
FIG. 1 is a side elevational view of the machine utilizing the present invention in which the feed end of the machine is removed.
Figure 2:
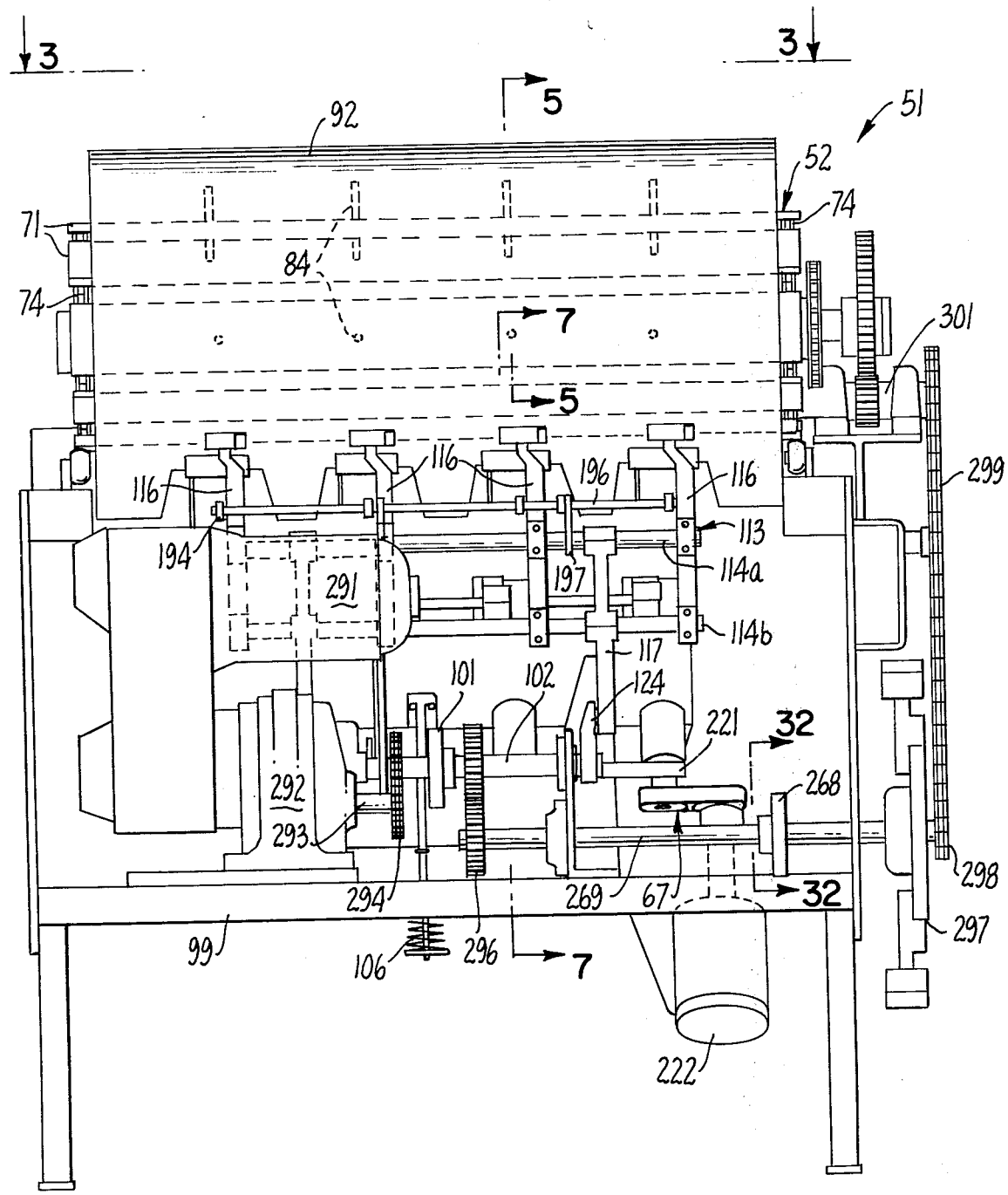
FIG. 2 is an end view of the machine of FIG. 1 taken along the plane of line 2—2 thereof.

The seed celling mechanism of the present invention will be shown and described in conjunction with a machine which is similar to the aforementioned Loveland machine but which includes several improvements thereover. Apples progress through the machine along multiple lanes, there being four such lanes shown in the illustrated machine. The progression of the apples will be described in some detail since it is important to note that the major moving functions are similarly carried out across the machine but that each apple is discretely measured and acted upon in each lane so that the seeed cell knife will cut an appropriate sized cavity in each individual apple. Thus, a large throughput of product is accomplished with a minimum of moving parts and power consumption.

Looking to the drawings and in particular to FIGS. 1 and 7-9, there is shown a multi-lane machine 51 for selectively removing the seed cell from previously cored apples and the like. Only one lane will be described in detail, it being understood that the remaining lanes are similar in structure and function.

Conveyor 52 has a plurality of open bottomed cups 53 for transporting the apples in single file relation along a path to transfer station 54. Orienting means 56 underlying conveyor 52 engage and rotate the apples through open bottomed cups 53 and align the core hole relative to the path. Spindle means 57 are movable to follow the path of cups 53 at transfer station 54 and has pin 58 engageable with the core hole for transferring the apple onto spindle means 57. A pair of centering jaw means 59 engageable with either end of the apple on spindle means 57 are formed to translate the apple along the spindle and center it at seed celling station 61. Knife means 62 carried in spindle means 57 at seed celling station 61 is movable outward of spindle means 57 into the seed cell of an apple at station 61. Knife control means 63 is formed to extend knife means 62 into the apple. Apple measuring means 64 engageable with the apple at seed celling station 61 is formed for determining the size of the apple and is coupled to knife control means 63 wherein the degree of extension of knife means 62 into the apple is determined by the size of the apple. Knife control timing means 66 is connected to knife control means 63 and sequenced with jaw means 59 such that knife means 62 is retracted with spindle means 57 when the apple is moved along the spindle means and knife means 62 is extended when an apple is properly centered at seed celling station 61. Means 67 rotate knife means 62 to cut a cavity around the seed cell of an apple at station 61 wherein the size of the cavity is proportional to the size of the apple. Antirotational means 68 at station 61 engage the outer surface of the apple to resist the torque on the apple from rotating knife means 62.

It should be noted that some of the features of the present machine are common with the aforesaid Loveland model but that several modifications have been made to increase the throughput as will be appreciated from the following complete description.

Figure 3:
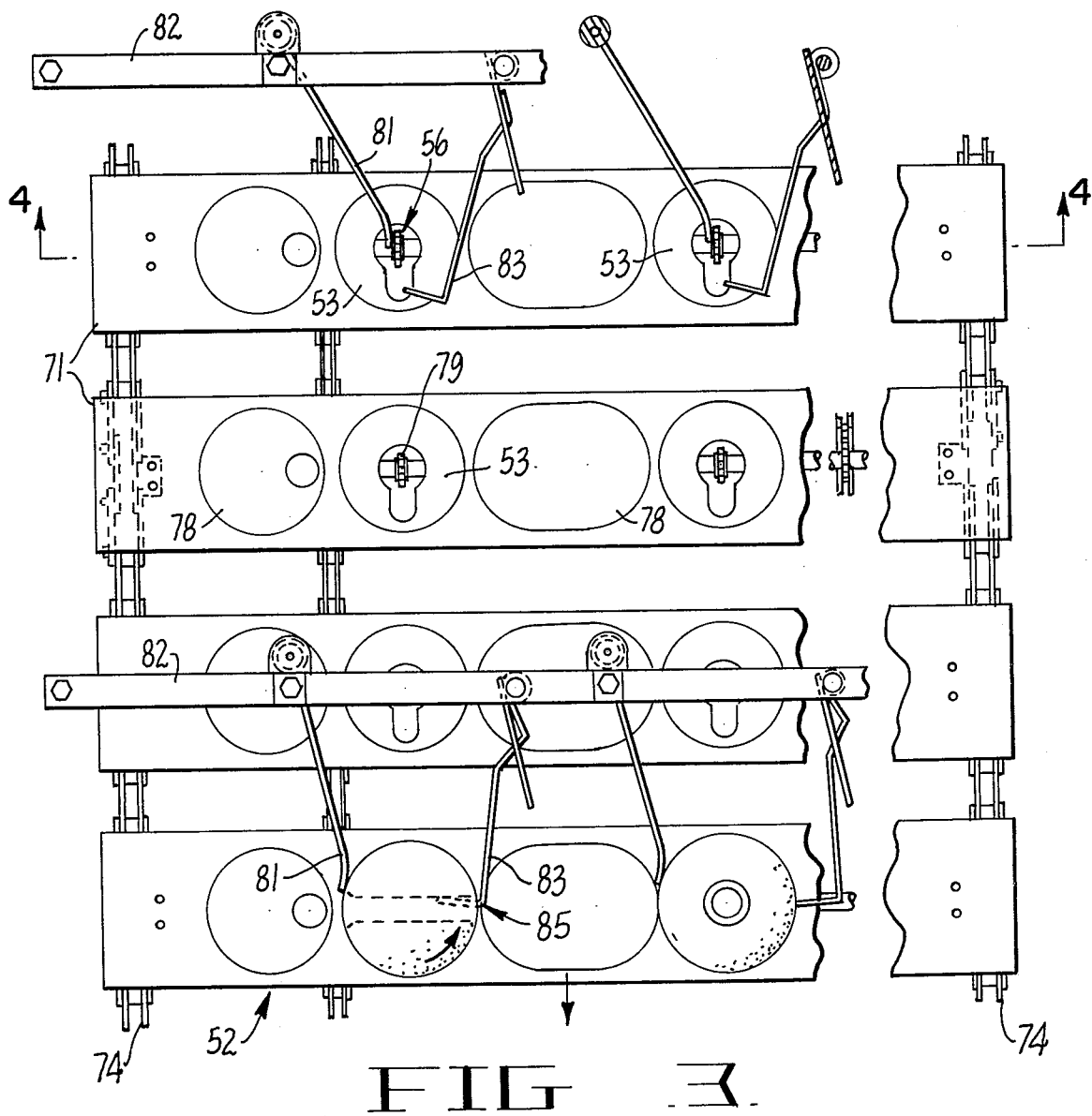
FIG. 3 is a fragmentary plan view with parts broken away of the orienting conveyor as shown in FIGS. 1 and 2 taken along the plane of line 3—3 in FIG. 2.
Figure 4:
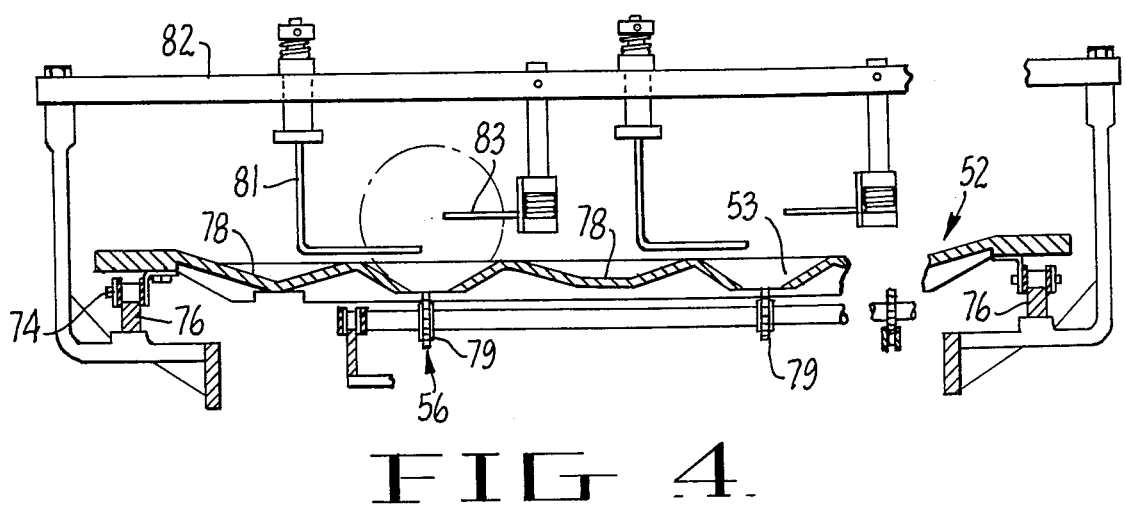
FIG. 4 is en elevational section taken along the plane of line 4—4 in FIG. 3.

Conveyor 52 is formed with transverse plates 71 extending along a horizontal upper run 72 and around a semi-circular run 73 at the tail end thereof. The outboard edges of plates 71 are supported by endless chains 74 which run on rails 76 along horizontal run 72 and on sprockets 77 around circular run 73. Each plate 71 is formed with a series of open bottomed cups 53 aligned with each lane and indented pockets 78 between cups 53. Orienting means 56 is formed of a series of eccentric knurled wheels 79 tracking below horizontal upper run 72 in a position to enter the bottom of cups 53 and rotate the apple therein until the core hole is encountered. Above conveyor means 52 spring loaded fingers 81 are positioned on brackets 82 to brush against the sides of passing apples and turn them in the cups 53. Wire elements 83 are similarly positioned on brackets 82 above conveyor 52 transversely of the path of the apples and bear against the sides of passing apples such as to enter the core hole of misoriented apples and rotate them so that the wheel 79 may traverse a different path in its search for the core hole as shown at 85 in FIG. 3.

Figure 5:
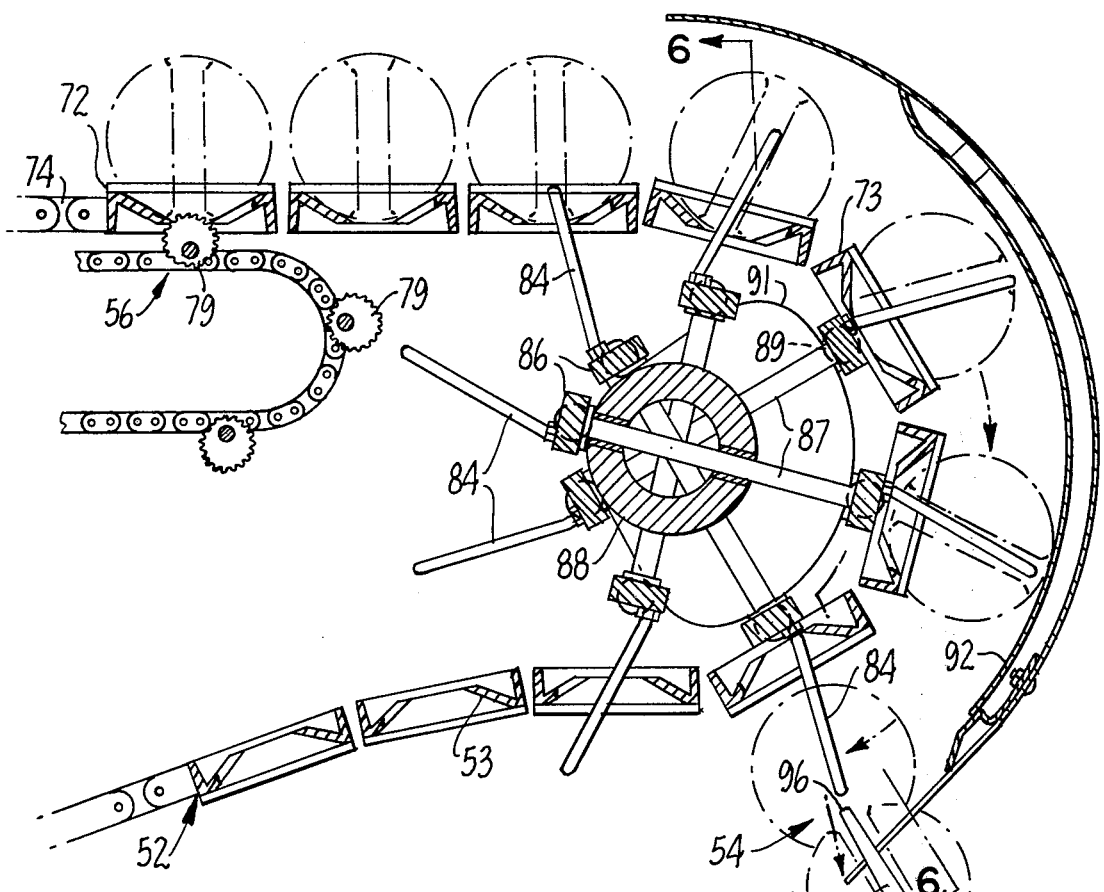
FIG. 5 is an elevational section taken substantially along the plane of line 5—5 in FIG. 2.
Figure 6:
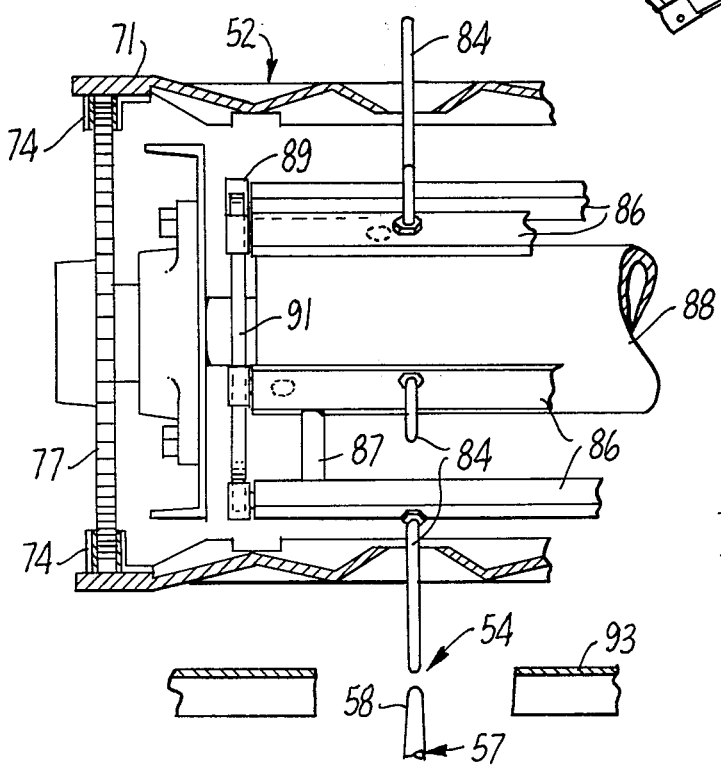
FIG. 6 is an elevational section taken substantially along the plane of line 6—6 in FIG. 5.

At circular end 73 of conveyor 52 pin 84 enters the open bottom of cup 53 and enters the core hole of properly oriented apples. Unoriented apples are displaced from the cup 53 by the pin 84 and they tend to move sideways of the lane into indents 78. Pins 84 are carried on crossbars 86 mounted on slidable rods 87. Rods 87 are journaled in tubular shaft 88. Cam rolls 89 carried at the ends of crossbars 86 ride on stationary cam 91 and elevate pins 84 at the start of circular run 73 and retract pins 84 from cups 53 at the end of circular run 73. Pins 84 support the apple around circular plate 92 while unoriented apples in indents 78 fall onto chute 93 for further processing or recycling. At the terminus of plate 92 the apples are transferred from pins 84 onto upstanding spindle means 57. Pins 84 are inclined toward the forward end of the path of cups as seen in FIG. 5. This allows the pin to enter on a line more nearly coincident with the axis of the core hole at the start of circular run 73 and also positions the core hole to fall more nearly vertical at transfer station 54.

Figure 11:
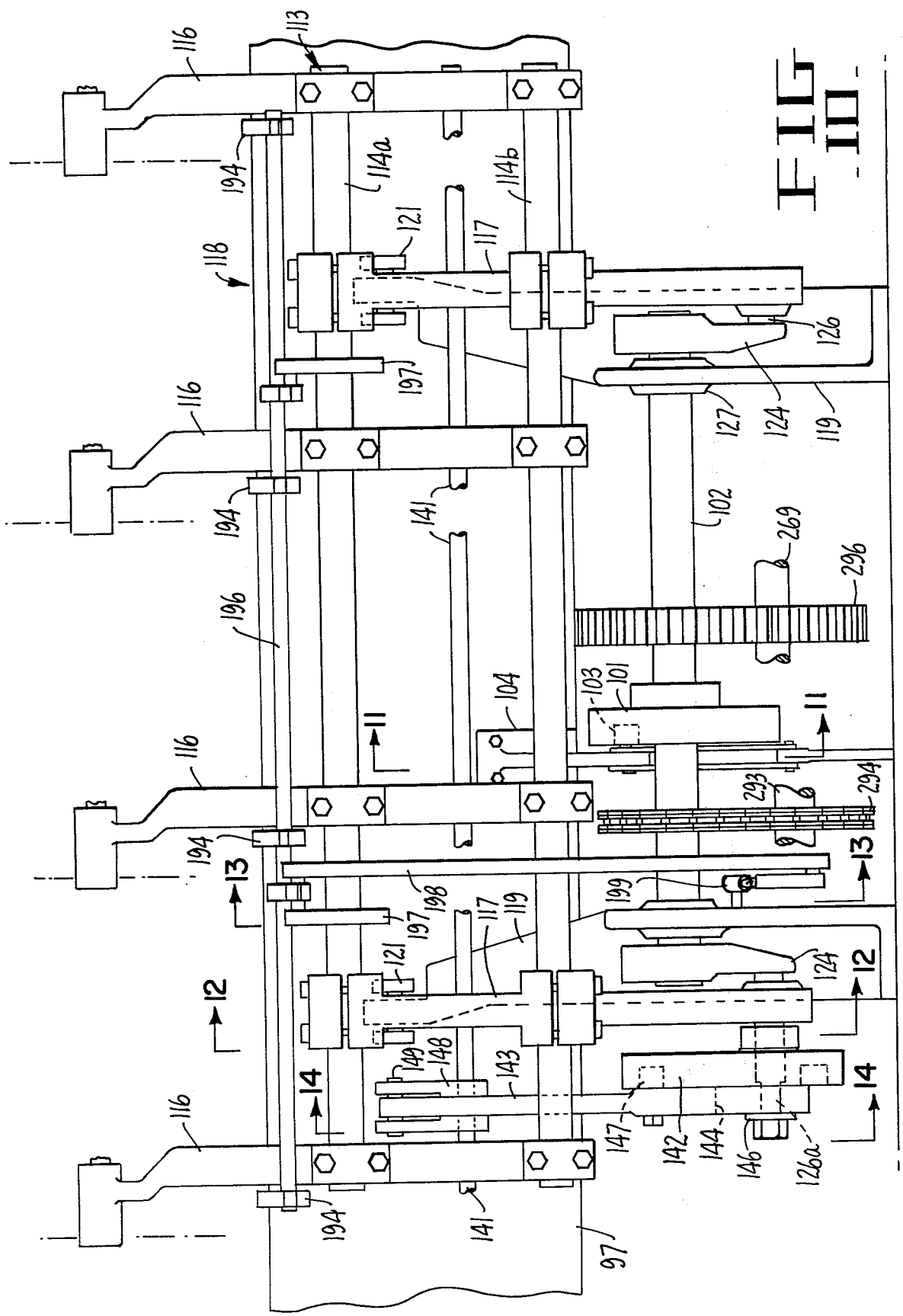
FIG. 11 is a fragmentary elevational view taken substantially along the plane of line 11—11 in FIG. 10 and illustrating the spindle tilt mechanism.

To facilitate transfer of the apple, spindle means 57 tracks or follows the path of cups 53 and pins 84 a short distance and also has a tapered end 94 of reduced diameter with bullet shaped point 96. Spindle means 57 is carried on tilt frame 97 journaled at 98 to main frame 99 (FIG. 11). Cam 101 on cam shaft 102 oscillates tilt frame 97 through cam follower 103 in a timed sequence as delineated by "Spindle Tilt" in FIG. 38. Bracket 104 of tilt frame 97 supports cam follower 103 and is biased by spring 106 to partially balance the overhanging weight of tilt frame 97.

As the pin 84 carries the apple beyond plate 92, the apple is permitted to fall onto spindle means 57. As the apple falls from pin 84 onto spindle means 57, its downward slide is arrested by leaf spring stop 107. Stop 107 is supported on semi-circular bracket 108 carried on tilt frame 97. Below stop 107, the diameter of spindle means 57 enlarges to nearly coincide with the diameter of the core hole.

Figure 12:
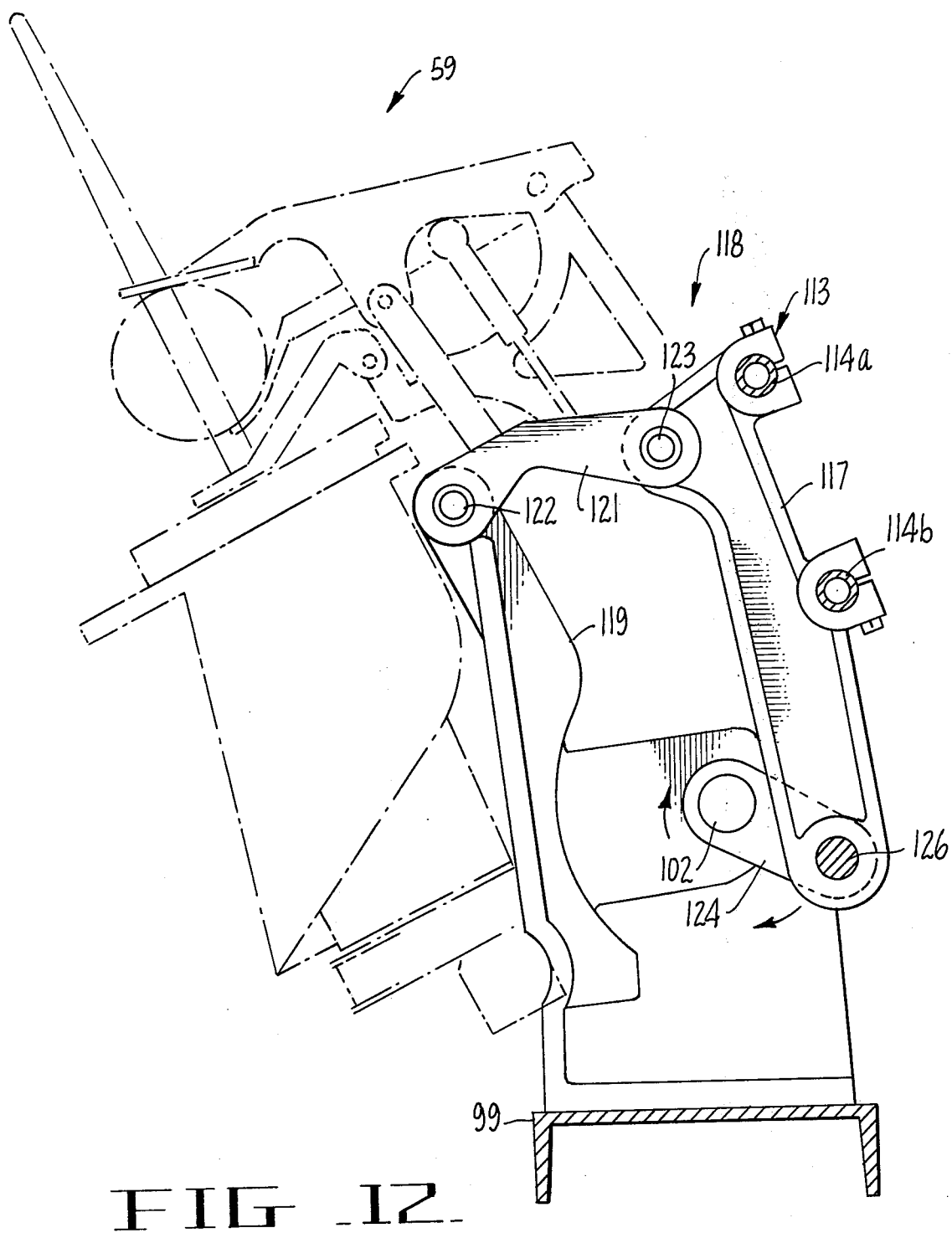
FIG. 12 is a fragmentary elevational view taken substantially along the plane of line 12—12 in FIG. 10 and illustrating the jaw carriage moving mechanism.

Jaw means 59 having upper and lower jaw members 111 and 112 move toward spindle means on jaw carriage means 113 to a position at either end of the apple. Carriage 113 is formed by a pair of transverse rods 114a and 114b extending across the machine and supporting jaw frame members 116 at each lane. Rods 114 of carriage 113 are tied together by a pair of links 117 (see FIGS. 10 and 12) and are elevated thereby through four-bar link mechanism 118.

Link mechanism 118 includes upstanding supports 119 secured to main frame 99 and links 121 bridging the top of supports 119 and links 117 through pivot pins 122 and 123. The lower end of links 117 are pivotally journaled to crank arms 124 through pins 126. Crank arms 124 are rotated by shaft 102 and act to raise and lower carriage 113 and also move jaw means 59 toward and away from spindle means 57 in timed sequence as delineated by "Carriage" in FIG. 38. Shaft 102 is supported in bearings 127 in upstanding members 119 (FIG. 10).

Upper and lower jaw members 111 and 112 are hinged on jaw frame members 116 through common pintle pin 128 and are opened and closed and locked by jaw control means 129. Upper jaw member 111 is coupled to jaw control means 129 by link 131 through pin 132 and lower jaw member 112 is similarly coupled by link 133 through pin 134. Upper jaw member 111 is bifurcated to fit around spindle pin 58 and push on the top end of the apple. Member 111 also carries bumper 136 to limit the upward travel of lower jaw member 112.

Figure 7:
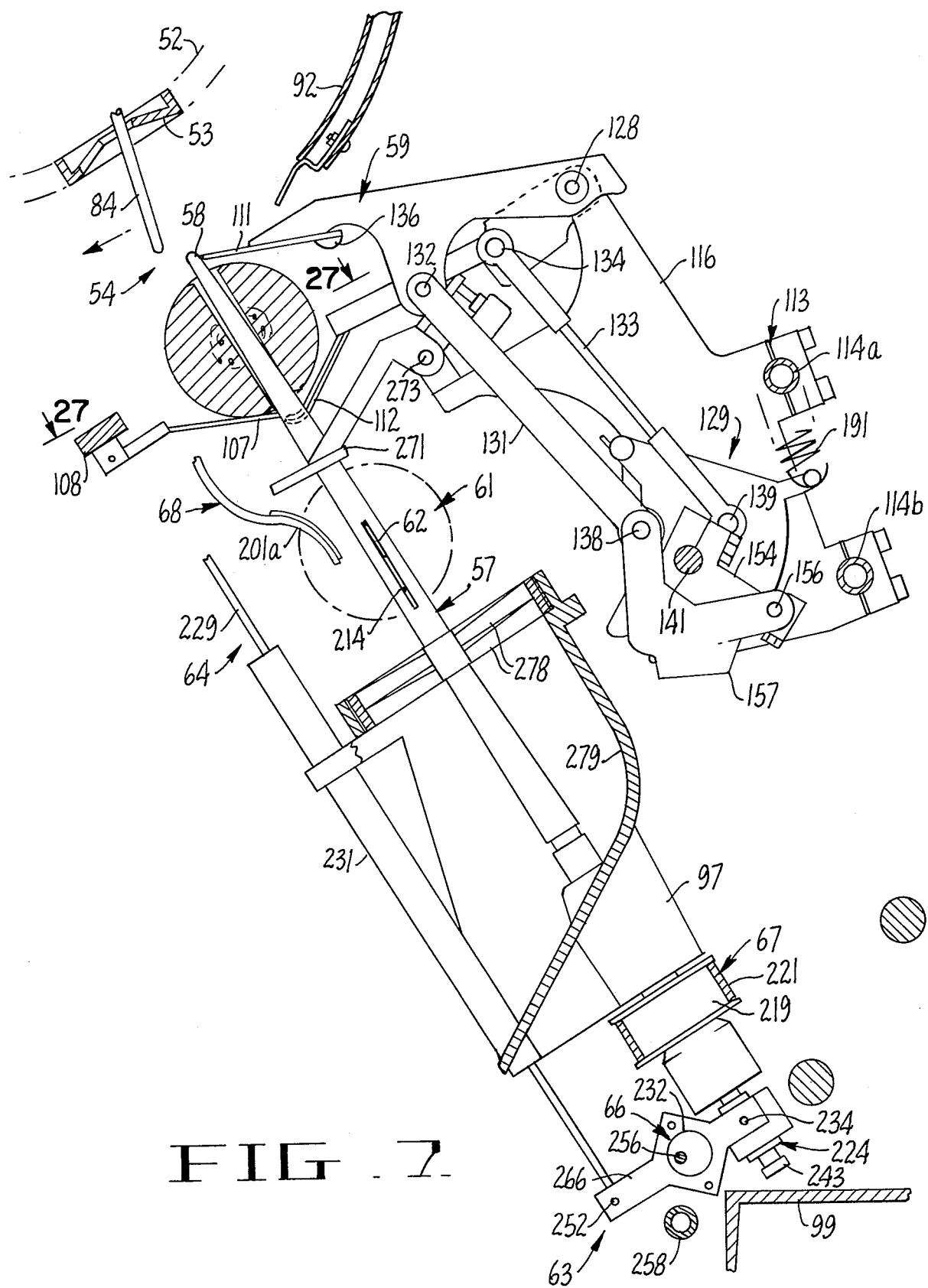
FIG. 7 is an elevational section taken substantially along the plane of line 7—7 in FIG. 2.
Figure 8:
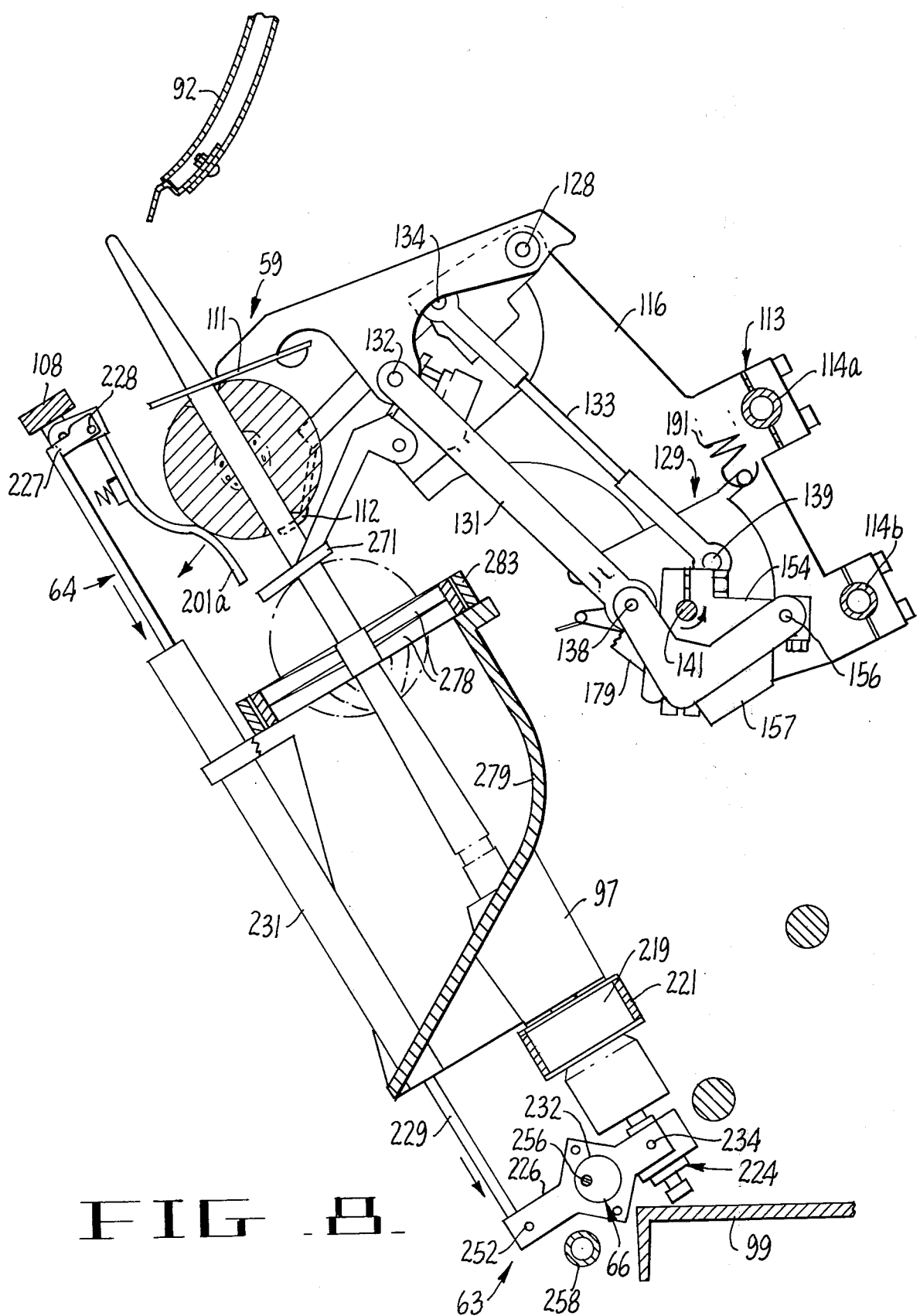
FIG. 8 is a view similar to FIG. 7 with the mechanism in another position.
Figure 9:
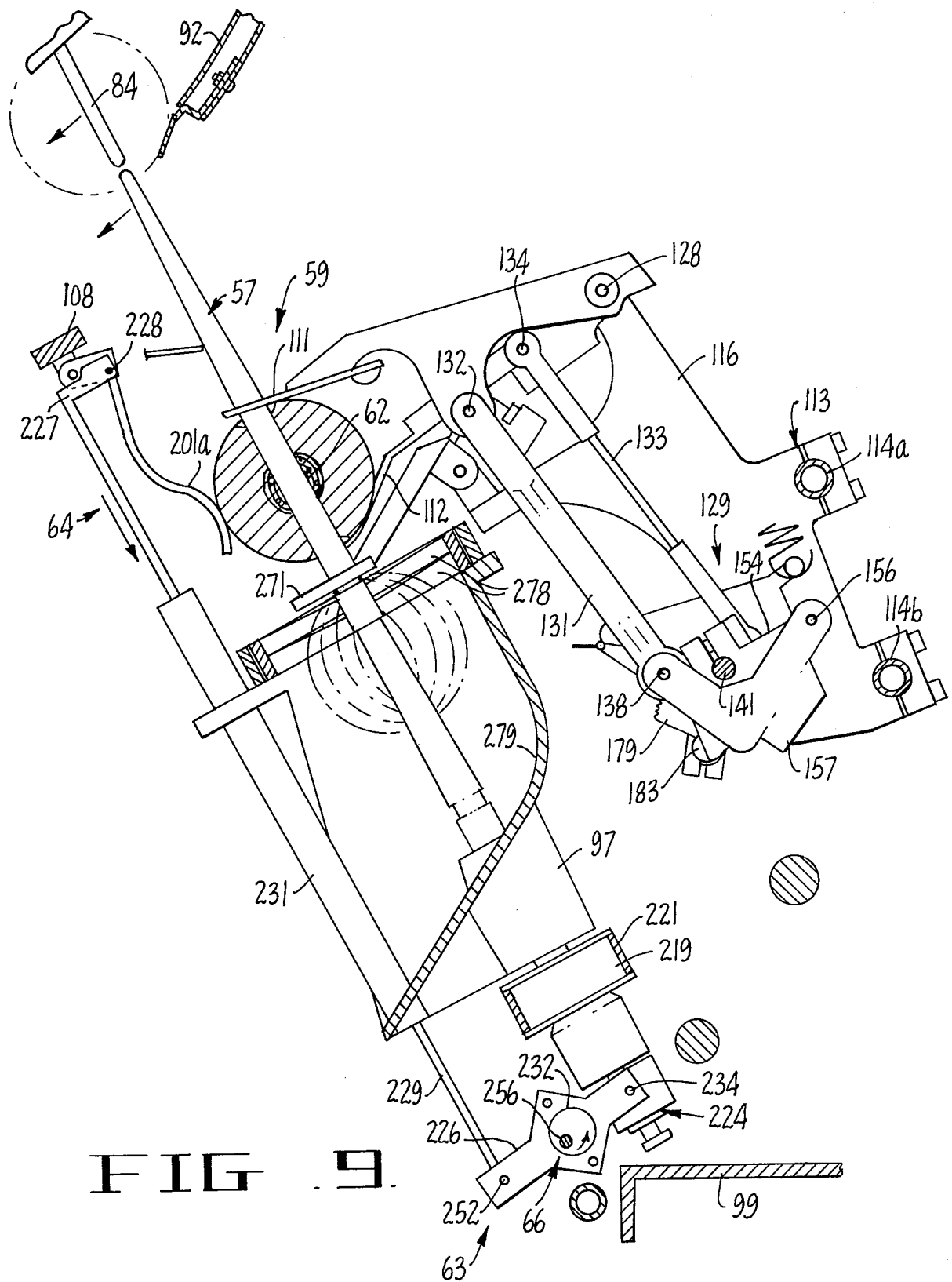
FIG. 9 is a view similar to FIGS. 7 and 8 with the mechanism in still another position.
Figure 14:
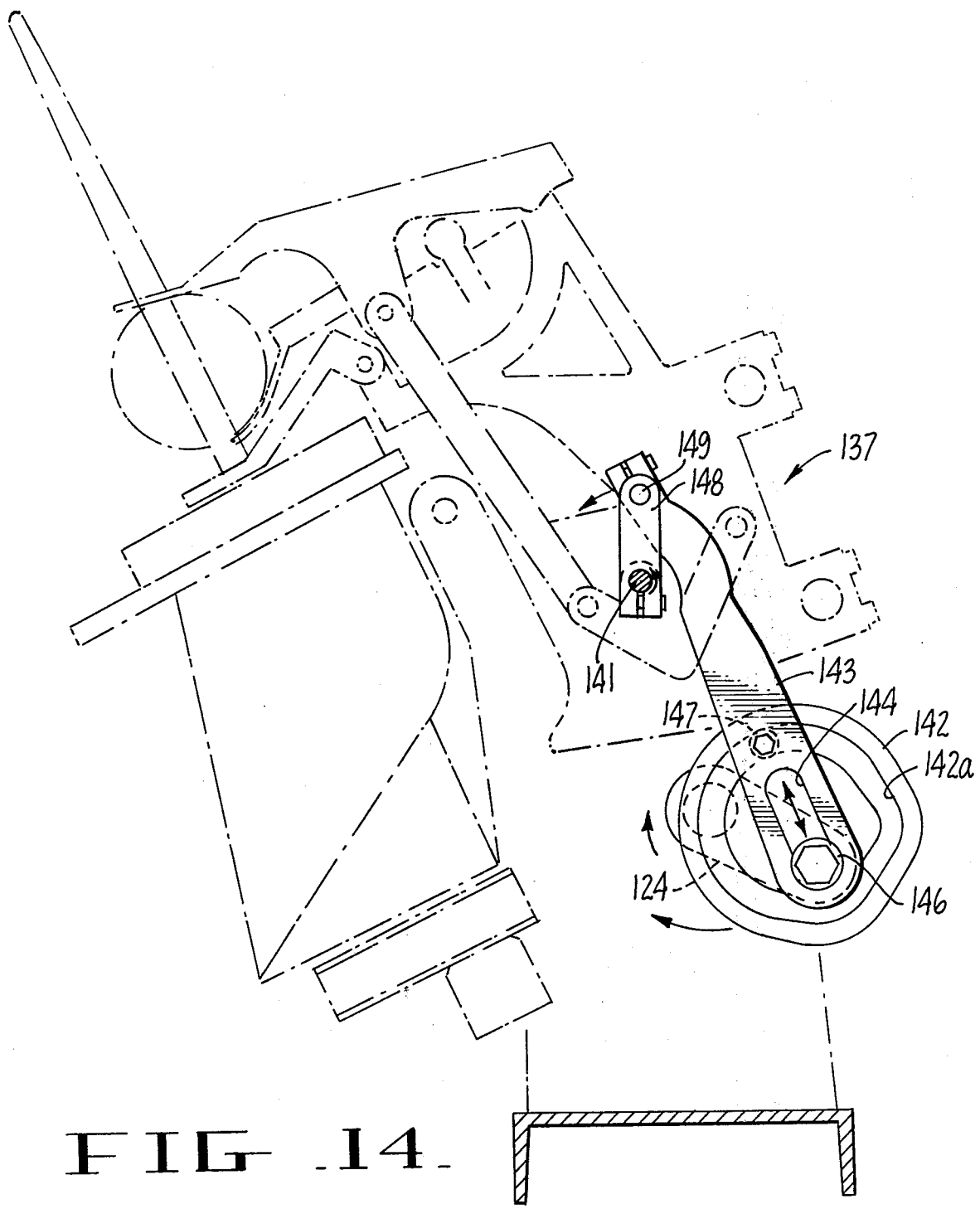
FIG. 14 is a fragmentary elevational view taken substantially along the plane of line 14—14 in FIG. 10 and illustrating the jaw control timing mechanism.

Jaw control means 129 is designed to open jaw means 59 as carriage 113 moves toward spindle 57 and to close and control jaw means 59 around the medial plane of the apple as the apple is moved along the spindle to seed celling station 61. Jaw control means 129 is sequenced by jaw control timing means 137 (FIG. 14). Links 131 and 133 are pivotally carried on jaw control means 129 on pins 138 and 139 on opposite sides of shaft 141. With shaft 141 rotated in the clockwise direction, upper jaw link 131 is elevated and lower jaw link 133 is lowered through jaw control means 129 to move jaw members 111 and 112 to the open position as shown in FIG. 7. As shaft 141 is rotated in the counterclockwise direction, jaw members 111 and 112 are moved together by their respective links through jaw control means 129 and close on the opposite sides of the apple (see FIGS. 8 and 9). Shaft 141 is rocked by the combined movements of crank arm 124 and cam 142 as shown in FIGS. 10 and 14. Crank arm 124 has an extended crank pin 126a at its outer end. Crank pin 126a is clamped to cam 142 and supports connecting link 143 through slot 144 between the face of cam 142 and washer 146. Connecting link 143 carries cam roll 147 in cam slot 142a and is pivoted at its upper end to rocker arm 148 on pin 149. Rocker arm 148 is clamped to shaft 141 and oscillates it in proper sequence as delineated by "Jaw Control Timing" in FIG. 38.

Jaw means 59 and jaw control means 129 are illustrated in detail in FIGS. 15–26. Jaw control means 129 is formed by a number of links and plates which allow jaw means 59 some independent movement over the movement of shaft 141 to accommodate various sized apples and also includes a dog and arcuate rack control mechanism 151 so that after an initial closing movement around the apple, the jaw means 59 is controlled relative to the medial plane of the apple as the apple is moved along spindle means 57.

FIGS. 15 and 21–23 show the jaw control means 129 as it appears when the jaw means is closed around a minimum sized apple and FIGS. 19 and 24–26 show the position of jaw control means 129 for the largest sized apple.

Figure 21:
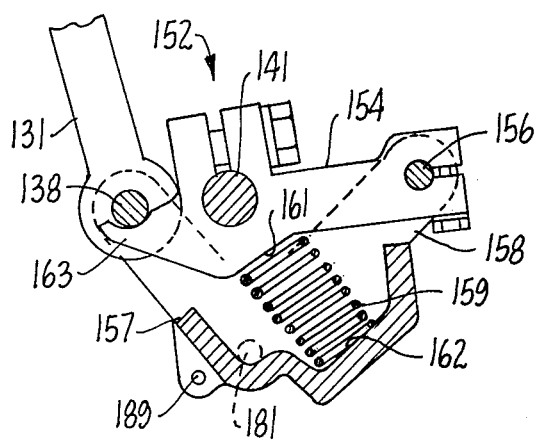
FIG. 21 is an elevational section taken substantially along the plane of line 21—21 of FIG. 17 illustrating the upper jaw control mechanism as it would appear when the upper jaw is closed on a small apple.
Figure 24:
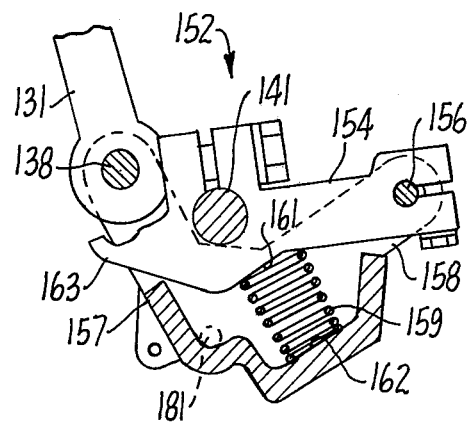
FIGS. 24, 25 and 26 are views similar to FIGS. 21, 22 and 23 but with the jaws around a large apple.
Figure 22:
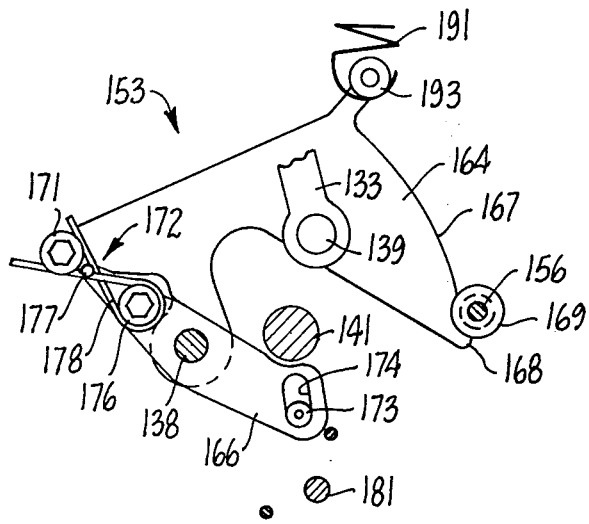
FIG. 22 is an elevational section taken substantially along the plane of line 22—22 of FIG. 17 illustrating the lower jaw control mechanism as it would appear when the lower jaw is closed on a small apple.
Figure 25:
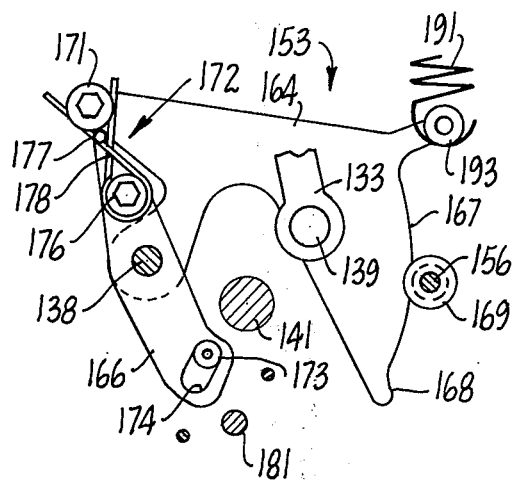
Figure 23:
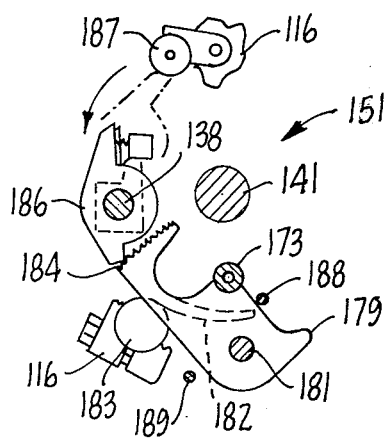
FIG. 23 is an elevational section taken substantially along the plane of line 23—23 of FIG. 17 illustrating the jaw control lock mechanism as it would appear when the jaws are closed around a small apple.
Figure 26:
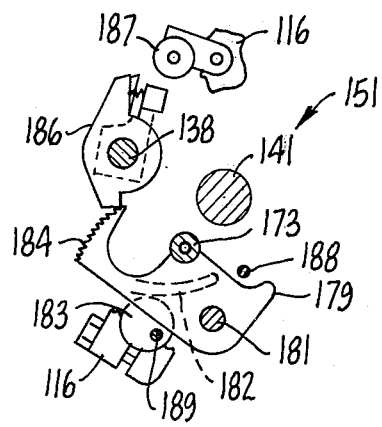
Figures 30, 31:
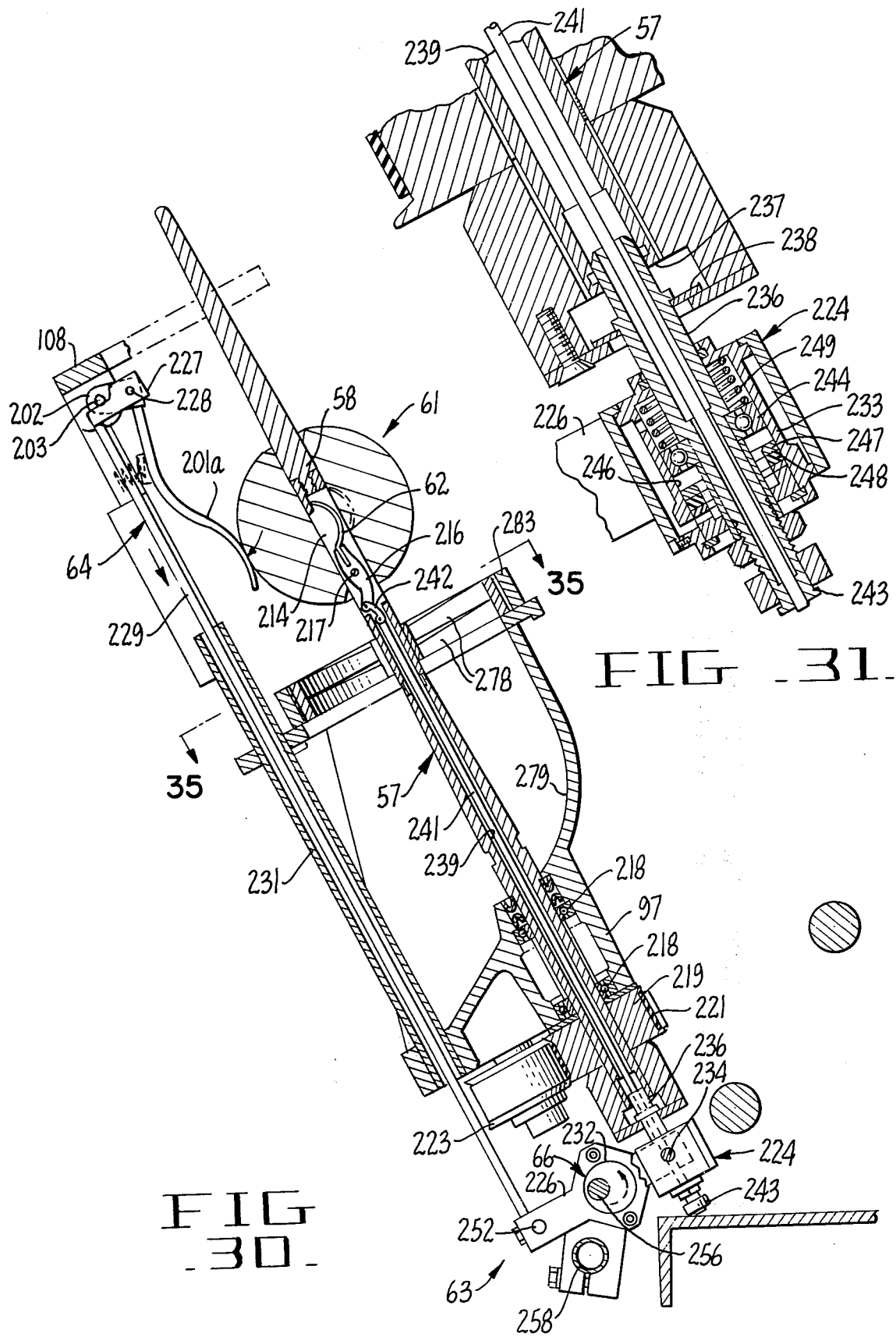
FIG. 30 is an elevational section similar to FIGS. 7-9 illustrating the seed celling knife in one of the spindles and the knife control means for extending the knife into the apple.
FIG. 31 is an enlarged section at the lower end of the spindle illustrating the lost motion device of the knife control means.
Figure 35:
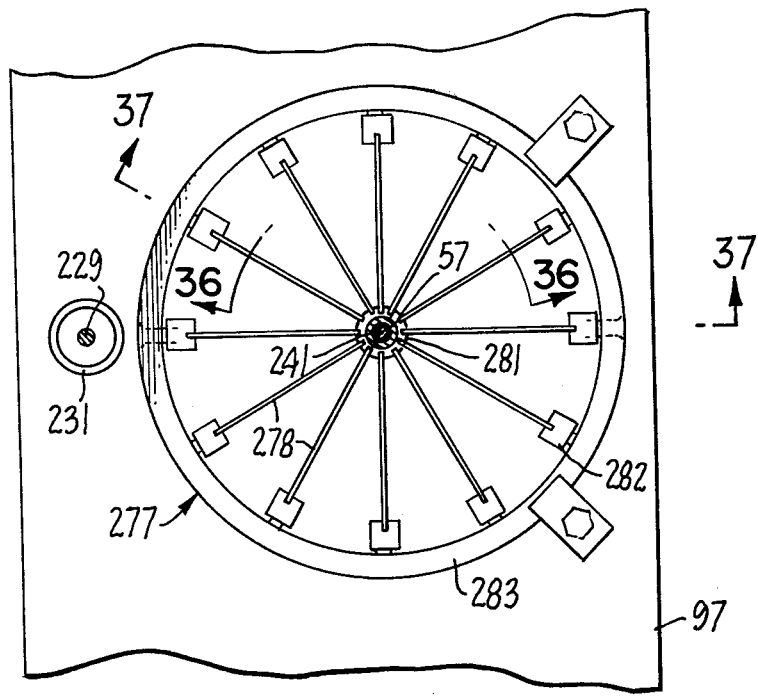
FIG. 35 is a plan section taken substantially along the plane of line 35—35 of FIG. 30 illustrating the segmenting slicing die.
Figure 36:
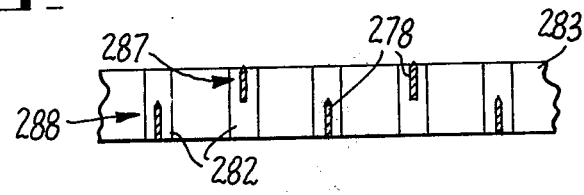
FIG. 36 is a developmental view taken substantially along the line 36—36 and illustrating the alternate high-low configuration of the slicing knives.

Jaw control means 129 is formed by three interdependent mechanisms incorporating an upper jaw control mechanism 152 illustrated in FIGS. 21 and 24, a lower jaw control mechanism 153 illustrated in FIGS. 22 and 25 and a dog and arcuate rack control mechanism 151 illustrated in FIGS. 23 and 26.

Upper jaw control mechanism 152 is formed by arm 154 clamped to jaw control timing shaft 141 and carrying pin 156 at its outer end. Cup shaped structure 157 underlies arm 154 and is journaled on pin 156 through side arms 158 while the distal end of arms 158 support the lower end of upper jaw link 131 through pin 138. Compression spring 159 extends between flat 161 on arm 154 and surface 162 on cup shaped structure 157 and biases pin 138 against stop finger 163. As shaft 141 is rotated in the clockwise direction, finger 163 will pick up pin 138 and elevate the upper jaw through link 131. When shaft 141 is rotated in the counterclockwise direction, pin 138 is pulled downward by arms 158 against the force of spring 159.

Lower jaw control mechanism 153 is formed by a pair of interconnected plates 164 and 166. Plate 164 is journaled on pin 138 and carries pin 139 supporting the lower end of jaw link 133. An arcuate surface 167 having stop 168 rides on a flanged roller 169 carried on pin 156 while the opposite end of plate 164 carries seat 171 for spring connection 172. Plate 166 is likewise journaled on pin 138 and engages a pin and roller 173 through slot 174 which acts as a cam surface to position member 179. The outer end of plate 164 carries spring connection 172 through spring 178 and pin 177 and seat 176 to plate 166. As pin 139 is lowered by lower jaw contact with the apple, plate 166 will swing member 179 about shaft 181 to a position governed by the size of the apple. At the same time, dogs 186 engage the arcuate rack of member 179 to retain its position during the rest of the counterclockwise motion of shaft 141; during which the arcuate surface 182, on rearward side of 179, rides on cam roll 183 to control the downward travel of pin 138 and the top jaw, according to the size of the apple.

Once the relative movement between member 179 and dogs 186 has been stopped by the arcuate surface 182 riding on cam roll 183 under the load of springs 159, further relative movement between the jaws is bypassed by spring 178. As previously noted, member 179 has cam surface 182 on its rearward side which is engageable with cam roll 183 carried on jaw frame 116. Member 179 is also formed with an arcuate rack 184 engageable with a pair of dogs 186. Dogs 186 are carried on pin 138 and are biased to close on the face of rack 184. With shaft 141 rotated in the clockwise or "jaw open" direction, dogs 186 are raised out of contact with rack 184 by release roller 187 carried on jaw frame 116. Stop pins 188 and 189 projecting from the rearward side of structure 157 limit the travel of member 179.

Figure 13:
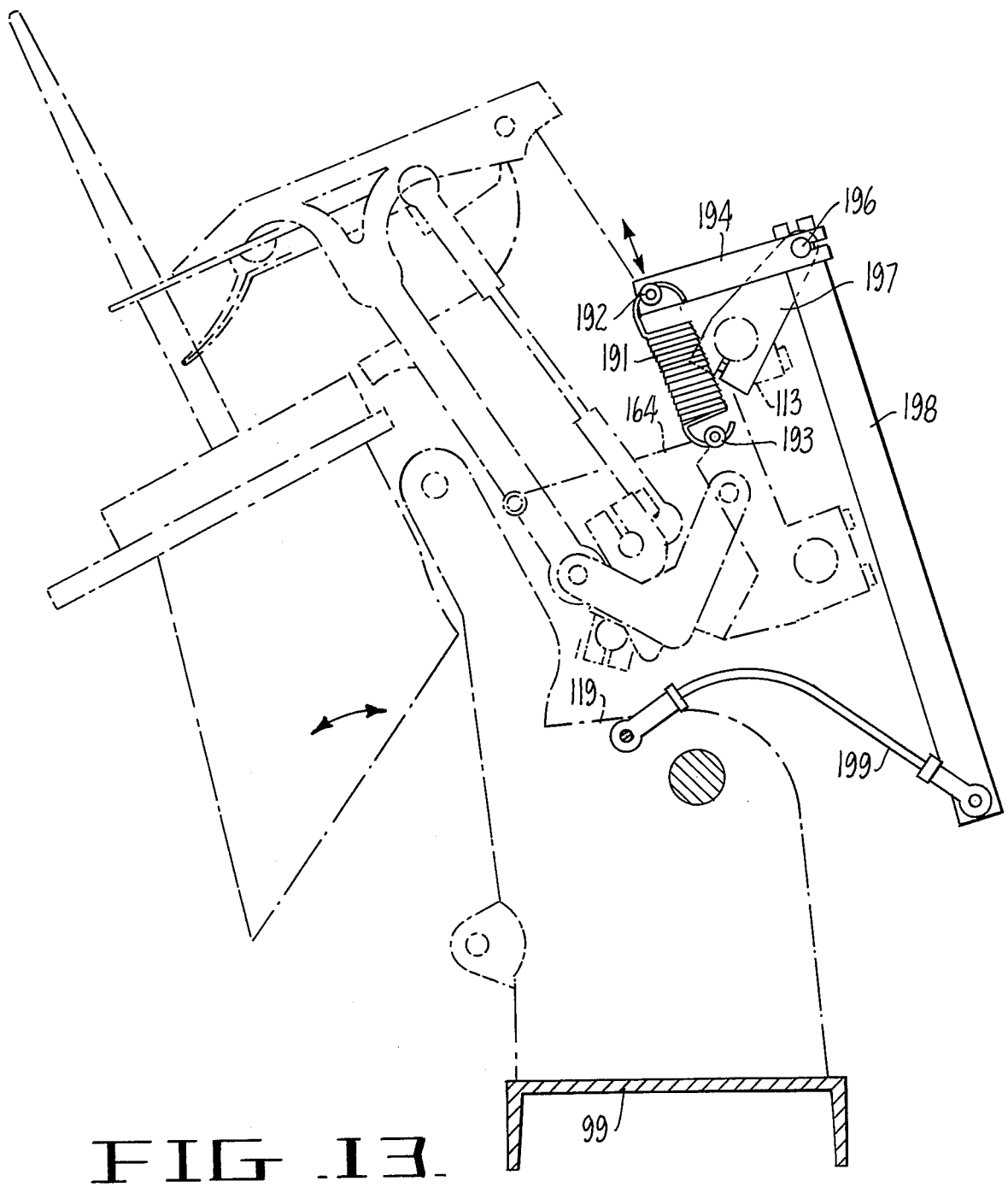
FIG. 13 is a fragmentary elevational view taken substantially along the plane of line 13—13 in FIG. 10 and illustrating the jaw tension spring mechanism.

With jaw means 59 appropriately closed and controlled around the medial plane of the apple, the apple is moved along spindle 57, to seed celling station 61. At the bottom of the downstroke of carriage 113, jaw means 59 are withdrawn from the spindle 57 and elevated to pick up the succeeding apple. During this upstroke shaft 141 is rotated in the clockwise direction to open the jaws and spring 191 is tensioned to apply an upward bias to plate 164 through pin 193. This tensioning is accomplished as shown in FIG. 13. The upper end of spring 191 is held on pin 192 of bar 194. Pin 192 is elevated by oscillating shaft 196 which is clamped by bar 194 and journaled to carriage frame 113 on arm 197. Shaft 196 is rotated on the upstroke of carriage 113 through link 198 by link 199 attached to upstanding frame members 119. With spring 191 tensioned plate 164 is elevated and this in turn keeps the lower jaw in contact with the apple during down travel of jaw means 59.

As the apple is moved along spindle 57 by jaw means 59, it contacts antirotational means 68 which hold the apple at the seed celling station 61. Fingers 201 depend from semi-circular bracket 108 and are spring biased to bear against the outer surface of the apple. Fingers 201 are mounted in pairs which are offset at the top and are aligned one above the other encircling seed celling station 61. Each finger 201 is suspended from arm 202 pivotally mounted on pin 203 from depending strut 204. Compression springs 206 are carried in sockets 207 on struts 204 and bear against plates 208 on fingers 201. The lower faces of fingers 201 have ridges 209 to securely grip the apple.

Semi-circular bracket 108 is mounted on tilt frame 97 and also supports leaf spring stop 107 on pin 211. Pin 211 journaled in bracket 108 is biased by torsion spring 212 to elevate leaf 107 against bolt head 213. The strength of spring 212 is chosen to support an apple on leaf 107 after transfer but to allow leaf 107 to be deflected when the apple is moved along the spindle by the jaw means.

The seed celling operation employs an improved method of removing the fibrous carpel material and seeds from the center of an apple by selectively cutting a spherical cavity therearound, which size is dependent on the size of the apple. Thus smaller apples will have less removed than larger apples.

Seed celling knife 62 is crescent or loop-shaped and is housed in spindle pin 58 in slot 214. Knife 62 is supported on member 216 and pivotal about pin 217 in response to knife control means 63. Spindle 57 is journaled in bearings 218 on tilt frame 97 and is continually rotated through pulley 219 and belt 221 by motor 222. All four spindles are driven in like manner with idler pulleys 223 supplying tension to belt 221 between lanes.

Knife control means 63 combines two movements to extend knife 62 beyond spindle 57, one component from measuring means 64, which detects the size of the apple and a second component from knife control timing means 66 which determines the position of the apple on the spindle. Measuring means 64 utilizes the displacement of one of the antirotational fingers 201a to detect the size of the apple. Since spindle 57 is continually rotating and finger 201a is displaced even as the apple is moved into seed celling station 61, provision is made to prevent knife 62 from extending into the apple until the apple is centered over the knife. This is provided by including a lost motion device 224 which will allow the measurement component to be inserted into the knife control means without actuating the knife means. The measuring component and timing component are combined along lever 226 while lost motion device 224 is subjected to the combined movements at the end of the lever.

Measuring means 64 includes plate 227 pivotally attached to pin 228 extending from the arm 202 which carries finger 201a of one of the antirotational means 68. Rod 229 is affixed to plate 227 and extends downward through tube 231 to one end of lever 226. As finger 201a is moved outward by an apple, rod 229 will be depressed a proportional distance and lever arm 226 will be moved a proportional degree around eccentric 232 to set lost motion device 224. Plate 227 is slidably attached to member 202 to allow adjustment of seed cell size range.

Lost motion device 224 takes the form of a cylinder 233 pivotally carried at 234 on the opposite end of lever 226 from rod 229. Piston 236 is slidable in both cylinder 233 and the lower end of spindle 57. Spindle 57 between stops 237 and 238 has a central bore 239 through which push rod 241 extends between piston 236 and knife means 62. Knife member 216 is connected to the upper end of push rod 241 through link 242 and is movable thereby to extend knife 62 outward of the spindle when push rod 241 is elevated.

Piston 236 is connected to push rod 241 through fitting 243 and is supported for rotational and axial movement by ball bearing 244 within cylinder chamber 246. Cylinder 233 supports pusher ring 247 and cushion 248 at a distance below bearing 244. This distance is the lost motion area between cylinder 233 and piston 236. Compression spring 249 bears on the upper side of bearing 244 and biases piston 236 downward to prevent knife 62 from flying outward of spindle slot 214 due to centrifugal force.

Lever 226 has a pair of parallel plates 251 coupled on pivot 252 to rod 229 at one end and to lost motion device 224 on pins 234 at the other end. An enlarged area 253 medially the ends supports eccentric 232 in needle bearings 254. Eccentric 232 is pinned to timing shaft 256 and is movable thereby to elevate the middle of lever 226 and pivot it around pivot 252 to elevate cylinder pusher 247 against piston bearing 244. Thus the previously mentioned movement components are combined through the lever and lost motion device such that the knife control means 63 moves the knife 62 outward of spindle 57 an amount determinate of the size of the apple and in a timed sequence to the position of timing shaft 256.

Timing shaft 256 extends between the bank of knife control means across the machine and is journaled in bearings 257. Outboard bearings 257a are in turn supported by tube 258 to lend support to the outer ends of shaft 256. Crank arm 259 is clamped to one end of shaft 256 and pivoted at 261 to link 262. Link 262 is pivotally secured to bell crank 263 through adjusting slot 264. Slot 264 allows for adjusting the maximum seed cell size. Bell crank 263 is journaled to main frame 99 on bracket 266 and carries cam roll 267 in cam track 268a of cam 268. Cam 268 is rotated by shaft 269 to actuate knife control means 63 in a timed sequence as delineated by "Seed Cell Knife" in FIG. 38. As shown therein, the slope of the cam slot is such that knife 62 is extended outward of spindle 57 to cut a set of spiral shells or slices around the seed cell of the apple. Similarly, the action of the knife 62 is timed to coincide with the jaw means 59 having centered an apple at seed celling station 61.

Figure 37:
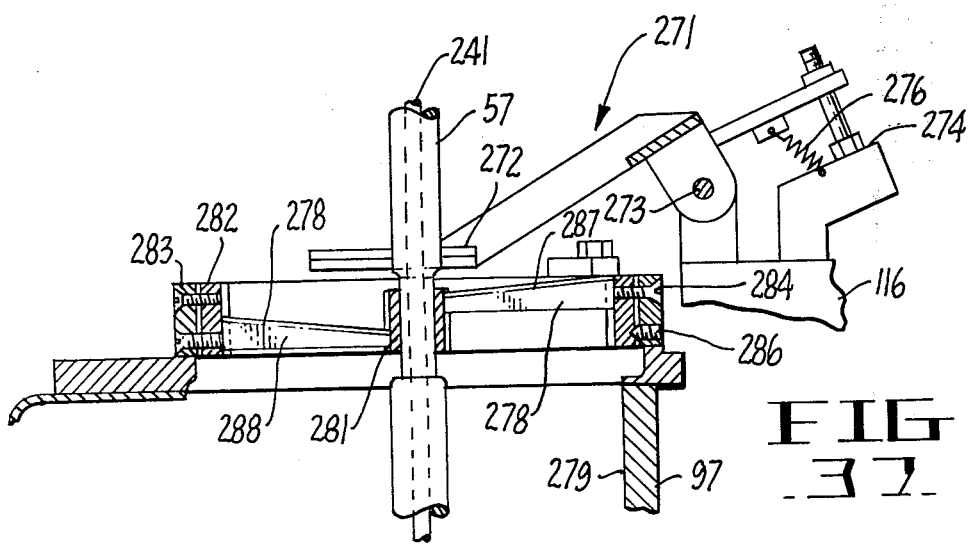
FIG. 37 is an elevational section of the slicing die and pusher element.

After seed celling the apple is displaced on the next down stroke of carriage 113 by pusher 271. Pusher 271 is a bifurcated arm member 272 pivoted at 273 to carriage frame member 116 and spring biased toward stop 274 by spring 276 (FIGS. 15–16 and 37).

Beneath seed celling station 61 is a segmented die 277 having a set of slicing knives 178 supported along the top of discharge chute 279 on tilt frame 97. Radially extending knife blades 278 are secured at their opposite ends to central hub 281 and to tensioning blocks 282. Blocks 282 are held in rim 283 by tensioning screws 284 and set screws 286. Alternate blades are displaced along the path of the apple such that the apple is sliced successively by alternate knife groups 287 and 288. This allows the apple to close up after the first cut in order to accommodate expansion by the second group of knives and prevents shattering the apple when a greater number of segments are desired. Afterwards the apple sections are directed by discharge chute 279 to conveyor 289 where they are removed for further processing.

Power for rotating the various shafts and conveyors is provided by motor 291 through gear box 292 to shaft 293. Shaft 293 drives cam shaft 102 through chain drive 294 while gear train 296 drives shaft 269. The outer end of shaft 269 supports balanced flywheel 297 and sprocket 298 of chain drive 299. Chain drive 299 powers jack shaft 301 near the top of the machine and provides power therethrough for conveyor 52 and orienting means 56.

OPERATION

Apples are supplied in single file fashion to open bottomed cups 53 on the horizontal run of conveyor 52 and are oriented by underlying eccentric wheels 79 with the core hole in a vertical position. At the semi-circular tail end of conveyor 52 pin 84 enters the bottom of cups 53 and threads the core hole of a properly oriented apple while displacing an unoriented apple from the lane. Pin 84 supports the apple around circular plate 92 to transfer station 54 where the apple falls from pin 84 onto rocking spindle 57 which is tracking the path of pin 84. The apple is arrested by stop 107 at a position to clear succeeding apples where a pair of upper and lower jaws 111 and 112 move in at either end of the apple on jaw carriage 13. The jaws are closed and controlled around the medial plane of the apple by jaw control means 129. Carriage 113 moves jaws 111 and 112 along the spindle 57 to translate the apple to seed celling station 61. At the seed celling station 61 the apple is supported by a set of depending encircling fingers 201 while carriage 113 retracts to move up for a succeeding apple. One of the fingers determines the radius of the apple medially the core hole axis which is adjacent the seed cell. Measuring finger 201a is coupled through rod 229 to one end of lever 226. Lever 226 pivots about eccentric 232 to preset the gap between pusher ring 247 in cylinder 233 and bearing 244 on piston 236. Timing shaft 256 is rocked to rotate eccentric 232 and elevate the midportion of lever 226 which pivots the lever about coupling pin 252. This further elevates cylinder 233 and moves piston 236 and push rod 241 to extend knife 62. With spindle 57 rotating, extension of knife 62 cuts a series of spiral slices around the seed cell of the apple to form a cavity dependent on the size of the apple. Then knife 62 is retracted by a reverse of these operations. On the next down stroke of carriage 113, pusher 271 contacts the top of the apple and displaces the apple along the spindle into segmenting die 277. In the multi-lane machine illustrated, the spindle tilting frame 97, jaw carriage 113, jaw control timing shaft 141 and knife control timing shaft 256 are in communication with each lane across the machine and are sequentially actuated by timing cams from a common drive system. A jaw control mechanism 129, a knife control means 63 and measuring means 64 are provided at each lane. Thus the apples in each lane are acted upon individually to locate the median plane thereof centrally over the seed cell station and to control the size of the cavity in each apple.

From the foregoing, it will be seen that an improved machine has been disclosed which provides for higher quality of product and functions in a smooth and efficient manner.

I claim:
1. A device for removing the seed cell from fruit having a core hole formed therethrough, comprising: an elongate spindle for extending through the core hole of the fruit to support the fruit; spaced jaw means engagable with opposite ends of the fruit to support the fruit and move the fruit along the spindle to center the fruit at a seed-celling station; fruit holding means at the seed celling station engagable with the outer surface of the fruit to hold it substantially stationary at the seed-celling station; said spindle having a slot therein at the seed-celling station and an elongate bore extending through the spindle to the slot; a seed-celling knife pivotally mounted in the slot for pivotal movement outwardly of the slot beyond the spindle and into fruit at the seed-celling station; knife control means connected with the knife to move the knife outwardly an amount commensurate with the size of the fruit to cut the seed cell from the fruit; said knife control means including a movable fruit measuring finger at the seed-celling station engagable with an outer surface of the fruit and movable upon engagement with the fruit as the fruit moves along the spindle to the seed-celling station; linkage means connected between the fruit measuring finger and the knife; said linkage means including a lost motion device which takes up movement of the fuit measuring finger and sets the measurement in the knife control means and prevents movement of the knife upon movement of the fruit measuring finger; and knife control timing means connected with the linkage means to pivot the knife outwardly an amount determined by movement of the finger as set in the knife control means and in timed relationship with centering of the fruit at the seed-celling station, whereby the knife is prevented from entering the fruit before the fruit is centered at the seed-celling station and the knife is extended an amount proportional to the size of the fruit to remove the seed cell therefrom.

2. A device as in claim 1, wherein means is connected with the spindle to rotate the spindle and knife as the knife is extended into the fruit to cut a series of spiral cuts in the seed cell to remove the seed cell.

3. The device as defined in claim 1 and wherein said knife is crescent-shaped and cuts a spherically shaped cavity in the seed cell.

4. The device as defined in claim 1 wherein said fruit measuring finger contacts the outer surface of the fuit medially of the ends thereof to measure the size of the fruit and transmits that measurement to the knife control means.

5. The device as defined in claim 1, wherein said jaw means are movable relative to the spindle to translate the fruit along the spindle and center the fruit at the seed-celling station with the seed cell of the fruit adjacent the knive, said fruit holding means including anti-rotation means engaging the outer surface of the fruit at said station to hold the fruit against rotation, said knife control timing means sequenced such that the knife is retracted within the spindle while the fruit is moved along the spindle and the knife control means is operated to extend the knife when the fruit is centered over the knife at the station.

6. The apparatus as defined in claim 1 and wherein said knife means is cresent-shaped and is pivotally carried at one end thereof in said slot in said spindle, said knife control means including a push rod carried within the longitudinal bore in the spindle to extend the knife from the spindle, said push rod being coupled to a lever at the outer end thereof through said lost motion device, said apple measuring finger coupled to said lever to move said lost motion device a distance corresponding to the size of the fruit, and said knife control timing means acts on said lever to move said lost motion device against said push rod and cause said knife to be extended a distance proportional to the movements of the said apple measuring finger and the said knife control timing means.

7. The apparatus as defined in claim 1 and wherein said knife is continually rotated as it is pivotally extended outwardly into the apple to cut a set of spiral shells in the seed cell to form said cavity.

8. The apparatus as defined in claim 1 and wherein said apple measuring finger comprises an anti-rotational means engagable with the apple.

9. A multi-lane machine for selectively removing the seed cell from previously cored apples and the like comprising: a conveyor having a plurality of open bottomed cups for transporting the apples in single file relation along a path to a transfer station; orienting means underlying said conveyor and engagable through the open bottomed cups with the apples therein to rotate the apple and align the core hole relative to the path; spindle means moveable to follow the path of the cups at the transfer station and having a pin engagable with the core hole for transferring the apple into the spindle; a pair of centering jaw means engagable with opposite ends of the apple on said spindle and formed to move the apple along the spindle and center the apple at a seed celling station; apple holding means at the seed celling station engagable with the outer surface of the apple to hold it substantially stationary at the seed-celling station; said spindle having a slot therein at the seed-celling station and an elongate bore extending through the spindle to the slot; a seed-celling knife pivotally mounted in the slot for pivotal movement outwardly of the slot beyond the spindle and into apples at the seed-celling station; knife control means connected with the knife to move the knife outwardly an amount commensurate with the size of the apple to cut the seed cell from the apple; said knife control means including a movable apple meausring finger at the seed-celling station engagable with an outer surface of the apple and movable upon engagement with the apple as the apple moves along the spindle to the seed-celling station; linkage means connected between the apple measuring finger and the knife; said linkage means including a lost motion device which takes up movement of the apple meausring finger and sets the measurement of the knife control means and prevents movement of the knife upon movement of the apple measuring finger; and knife control timing means connected with the linkage means to pivot the knife outwardly an amount determined by movement of the finger as set in the knife control means and in timed relationship with centering of the apple at the seed-celling station, whereby the knife is prevented from entering the apple before the apple is centered at the seed-celling station and the knife is extended an amount proportional to the size of the apple to remove the seed cell therefrom.

10. The machine as defined in claim 9 and wherein said knife control means has a push rod carried in the bore of the spindle which acts on a link to move said knife means outward.

11. The device as defined in claim 10 and wherein said push rod is coupled to said lost motion device at its outer end, and said apple measuring finger and said knife control timing means are operatively connected to said lost motion device such that the push rod and associated knife are displaced an amount proportional to the combined movements of the apple measuring finger and knife control means.

12. The machine as defined in claim 11 and wherein said lost motion device is carried at one end of a lever, said apple measuring finger is operatively connected to the opposite end of said lever, and said knife control timing means is operatively connected through an eccentric to the lever medially of the ends such that said lost motion device is initially set by the apple measuring finger by pivoting the lever about an eccentric and subsequently the lost motion device is displaced by rotation of said eccentric to displace the push rod and associated knife a distance proportional to the movement of the apple measuring finger in timed sequence to the knife control timing means.

13. The machine as defined in claim 9 in which said anti-rotational means includes a plurality of fingers depending from a bracket in the direction of travel of the apple and spring biased inward to bear against the outer surface of the apple at the seed cell station, one of said fingers comprising the apple measuring finger.

14. The machine as defined in claim 9 in which a series of slicing dies are carried around said spindle subjacent the seed celling station, a pusher carried subjacent the pair of jaw means and displaces the apple along the spindle from the seed cell station into the slicing die.

15. The machine as defined in claim 14 and wherein said slicing die comprises plurality of radially extending knife blades which are alternately displaced along the path of the apple to provide two knife groups such that the apple is sliced successively by alternate slicing knife groups.

16. The machine as defined in claim 9, and wherein said conveyor has a horizontal upper run extending around a semi-circular run at a tail end thereof; said orienting means comprise a series of eccentric wheels tracking beneath the horizontal upper run and engagable with the apples to rotate the apples until the core hole is encountered; wire elements positioned above the conveyor transversely of the path of the apples and which bear against the sides of passing apples such as to enter the core hole of a misoriented apple and rotate it; pins slidably mounted in a rotatable support at the semi-circular rim of the conveyor to enter the bottom of the cups and thread through the core hole of a properly oriented apple; said pins being inclined toward the forward end of the path of the cups and being supported to follow the cups around the tail end of the conveyor; a curved plate at the semi-circular run of the conveyor supporting the threaded apple to said transfer station; said spindle being upstanding in a position subjacent the lower end of the curved plate and being continually rocked by a tilting frame to track the motion of the passing cups such that properly oriented apples fall free from the supporting pins and curved plate onto the spindle; a jaw carriage supports and moves said jaw means toward and down along said spindle to the seed cell station and retracts and elevates the jaw means to the transfer station; a jaw control mechanism is carried by said jaw carriage and is formed to close and control the jaw means about the median plane of the apple as the jaw means moves the apple along the spindle; a jaw control timing means is connected with said jaw control mechanism and is adapted to actuate said jaw control mechanism to open and close and control said jaw means in a timed sequence; said spindle tilting frame, said jaw carriage, said jaw control timing means and said knife control timing means are in communication with each lane across the machine and are sequentially actuated by timing cams from a common drive system; and said jaw control mechanism, and said knife control and said apple measuring means are discrete at each lane such that the apples in each lane are acted upon individually to locate the median plane thereof centrally over the seed cell station and to control the size of the cavity cut in each apple.

* * * * *